United States Patent
Liu et al.

(10) Patent No.: US 12,444,925 B2
(45) Date of Patent: Oct. 14, 2025

(54) PHOTOVOLTAIC SYSTEM, INVERTER, AND DIRECT CURRENT ELECTRIC ARC DETECTION METHOD

(71) Applicant: Huawei Digital Power Technologies Co., Ltd., Shenzhen (CN)

(72) Inventors: Yongquan Liu, Xi'an (CN); Guilei Gu, Shanghai (CN); Gang Xiao, Xi'an (CN); Dili Zhu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 173 days.

(21) Appl. No.: 17/940,191

(22) Filed: Sep. 8, 2022

(65) Prior Publication Data
US 2023/0071656 A1    Mar. 9, 2023

(30) Foreign Application Priority Data
Sep. 9, 2021    (CN) ................. 202111056652.3

(51) Int. Cl.
*H02H 7/122*    (2006.01)
*H02S 40/32*    (2014.01)
*H02S 50/10*    (2014.01)

(52) U.S. Cl.
CPC ........... *H02H 7/1227* (2013.01); *H02S 40/32* (2014.12); *H02S 50/10* (2014.12)

(58) Field of Classification Search
CPC ........ H02H 7/1227; H02H 9/08; H02S 40/32; H02S 50/10; Y02E 10/50; Y02E 10/56; H02M 7/42; H02J 3/381; H02J 2300/24
USPC .................................................. 361/180, 18
See application file for complete search history.

(56) References Cited

U.S. PATENT DOCUMENTS

2013/0170084 A1* 7/2013 Strobl .................. G01R 31/69
                                                                361/79
2017/0170782 A1* 6/2017 Yoscovich ............. H02S 50/00

FOREIGN PATENT DOCUMENTS

| CN | 108183509 A |   | 6/2018 |           |
|----|-------------|---|--------|-----------|
| CN | 109802441 A | * | 5/2019 |           |
| CN | 112462176 A | * | 3/2021 | G01R 19/12|
| EP | 3349317 A1  | * | 7/2018 | H02H 1/0015|

(Continued)

OTHER PUBLICATIONS

M. K. Alam, F. Khan, J. Johnson and J. Flicker, "A Comprehensive Review of Catastrophic Faults in PV Arrays: Types, Detection, and Mitigation Techniques," in IEEE Journal of Photovoltaics, vol. 5, No. 3, pp. 982-997, May 2015 (Year: 2015).*

*Primary Examiner* — Sreeya Sreevatsa
(74) *Attorney, Agent, or Firm* — Maier & Maier, PLLC

(57) ABSTRACT

A photovoltaic system, an inverter, and a direct current electric arc detection method. The system includes an inverter, a controller, and at least two converters. When detecting an electric arc, the controller controls an input current of the inverter to decrease to extinguish the arc. After the arc is extinguished, the controller controls an output voltage of at least one photovoltaic string to decrease to a first preset voltage, where the first preset voltage is less than an input voltage of the inverter when the electric arc is detected, or controls a maximum value of an output current of the at least one photovoltaic string to be a second preset current, where the second preset current is less than the input current of the inverter when the electric arc is detected. In the foregoing two recovery manners, no electric arc recurs.

14 Claims, 11 Drawing Sheets

---

Control an input current of an inverter to decrease when an electric arc is detected, to extinguish the arc — S1201

Control an output voltage of at least one photovoltaic string to decrease to a first preset voltage, or control a maximum value of an output current of the at least one photovoltaic string to be a second preset current — S1202

(56) References Cited

FOREIGN PATENT DOCUMENTS

EP 3667902 A1 6/2020
JP 2016157364 A * 9/2016 ............. G01R 31/69

* cited by examiner

PHOTOVOLTAIC SYSTEM, INVERTER, AND DIRECT CURRENT ELECTRIC ARC DETECTION METHOD

CROSS-REFERENCE TO RELATED APPLICATION

This application claims priority to Chinese Patent Application No. 202111056652.3, filed on Sep. 9, 2021, which is hereby incorporated by reference in its entirety.

TECHNICAL FIELD

The embodiments relate to the field of photovoltaic power generation technologies, =a photovoltaic system, an inverter, and a direct current electric arc detection method.

BACKGROUND

An electric arc is a gas discharge phenomenon. An electric current may be ionized by using some insulation media (such as air) to generate transient sparks. An electric arc may produce high temperature, and a strong electric arc may produce an open flame. The electric arc may cause a surrounding insulation material to be decomposed or carbonized to lose an insulation function and may easily cause the surrounding material to reach an ignition point and catch fire.

The electric arc requires a voltage and a current to maintain burning. If the voltage or current is low, the electric arc is quickly extinguished. Therefore, an NEC 2017 690.11 standard clearly defines an electric arc protection function. If the voltage is less than 80 V, electric arc detection can be exempted. That is, if the voltage is less than 80 V, no electric arc fault occurs or the electric arc is quickly extinguished due to instability.

Direct current electric arc detection is to detect frequency domain information of a current or a voltage of an electric arc, for example, frequency domain information such as a frequency, energy, and a variation. Because an operating environment of a device is complex and changeable, when ambient noise is approximate to a spectrum characteristic of the electric arc, whether the electric arc is really produced cannot be determined, and an electric arc fault is easily falsely reported.

Currently, most fire accidents in a photovoltaic system are caused by a direct current electric arc fault. The direct current electric arc fault is caused by the following reasons: there are a large quantity of wiring terminals, and connection terminals are incompatible or are not reliably connected; a cable is long and easily aged and damaged when placed in the open air; and a direct current voltage is high.

However, with development of module-level power electronic (MLPE) products in the photovoltaic system, high-frequency noise of a converter interferes with electric arc fault detection. Consequently, whether an electric arc fault really occurs cannot be accurately detected.

SUMMARY

To resolve the foregoing problem, the embodiments may provide a photovoltaic system, an inverter, and a direct current electric arc detection method, to accurately detect whether an electric arc fault occurs.

The photovoltaic system includes an inverter, a controller, and at least one converter. An input terminal of the inverter is connected to a photovoltaic string. Each photovoltaic string includes at least one converter. An input terminal of each converter is connected to a corresponding photovoltaic module. When detecting an electric arc in the photovoltaic system, the controller controls an input current of the inverter to decrease to extinguish the arc, that is, recovering after the arc is extinguished to determine whether the electric arc really occurs. Recovering can be implemented in the following two manners. If the photovoltaic system can recover, it indicates that there is no electric arc. Otherwise, it indicates that there is the electric arc.

In a first manner, an output voltage of the at least one photovoltaic string is controlled to decrease to a first preset voltage, where the first preset voltage is less than an input voltage of the inverter when an electric arc is detected. In other words, the output voltage of the photovoltaic string is pulled down, to avoid causing an electric arc again in an electric arc confirmation process.

In a second manner, a maximum value of an output current of the at least one photovoltaic string is controlled to be a first preset current, that is, the output current of the photovoltaic string is limited. In other words, regardless of how the voltage is controlled, the output current of the photovoltaic string is less than or equal to the first preset current, and the first preset current is less than the input current of the inverter when an electric arc characteristic is detected. That is, the current is pulled down to confirm whether the electric arc really occurs. Because the current decreases in a recovery process, no electric arc is caused again in the confirmation process.

In the foregoing two manners, if the system can successfully recover, it indicates that there is no electric arc, and the detected electric arc is caused by another reason. If the system cannot successfully recover, it indicates that the electric arc really occurs, and the detected electric arc is caused by the electric arc itself. Regardless of a voltage pull-down manner or a current pull-down manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

In a possible implementation, the controller is further configured to increase the input current of the inverter after controlling the output voltage of the at least one photovoltaic string to decrease to the first preset voltage. The input current of the inverter may start to increase after the arc is extinguished. A current value to which the input current of the inverter increases is not limited. For example, after the arc is extinguished, the controller controls the output voltage of the at least one photovoltaic string to decrease to the first preset voltage and increases the input current of the inverter to the corresponding input current of the inverter when the electric arc is detected.

In a possible implementation, the controller is further configured to decrease the input voltage of the inverter after controlling the maximum value of the output current of the at least one photovoltaic string to be the first preset current. The input voltage of the inverter may start to decrease after the arc is extinguished. A voltage value to which the input voltage of the inverter decreases is not limited. For example, after the arc is extinguished, the controller controls the maximum value of the output current of the at least one photovoltaic string to be the first preset current and decreases the input voltage of the inverter to the corresponding input voltage of the inverter when the electric arc is detected.

For example, when detecting the electric arc, the controller may first record a current operating point of the photovoltaic string, that is, record a current output voltage and output current of the photovoltaic string. It should be understood that the output voltage and the output current herein are an output voltage and an output current that are obtained after the converter is connected in series. For ease of understanding, the following embodiment is described by using an example in which a second preset current is the input current of the inverter when the electric arc characteristic is detected, and a second preset voltage is the input voltage of the inverter when the electric arc characteristic is detected. The second preset current may alternatively be another current value and may be less than the input current of the inverter when the electric arc characteristic is detected, provided that the second preset current is greater than a current during arc extinguishing. The second preset voltage may alternatively be another voltage value and may be less than the input voltage of the inverter when the electric arc characteristic is detected.

In addition, there is no relationship between the first preset voltage and the second preset voltage, and there is no relationship between the second preset current and the first preset current. The first preset voltage and the second preset voltage are voltages in two different implementation solutions. The second preset current and the first preset current are currents in two different implementation solutions.

In a possible implementation, the controller is configured to: when detecting the electric arc characteristic, control the input current of the inverter to decrease to zero to extinguish the arc, and when the input current is 0, the inverter operates in an open-circuit voltage operating state. In addition, the input current of the inverter may also be controlled to decrease to another value, provided that the arc can be extinguished.

To make the photovoltaic system recover when it is determined that the detected electric arc is a false electric arc, for example, to perform maximum power tracking, electric arc confirmation control is not performed. For a voltage pull-down solution, the controller is further configured to: if no electric arc is detected within a preset time period after increasing the input current of the inverter to the input current of the inverter when the electric arc is detected, skip controlling the output voltage of the at least one photovoltaic string to decrease to the first preset voltage, that is, skip limiting the voltage. For a current limiting solution, the controller is further configured to: if no electric arc is detected within a preset time period after decreasing the input voltage of the inverter to the input voltage of the inverter when the electric arc is detected, skip controlling the maximum value of the output current of the at least one photovoltaic string to be the first preset current, that is, skip limiting the current of the converter.

In a possible implementation, that the controller decreases the output voltage of the at least one photovoltaic string to the first preset voltage may be implemented by controlling an output voltage of each converter in the at least one photovoltaic string to decrease. Because a plurality of converters is connected in series, if a total voltage obtained after series connection is reduced, to facilitate controlling, the output voltage of each converter connected in series may be reduced. Additionally, output voltages of some converters may also be reduced.

In a possible implementation, the controller may control an output voltage of the converter to decrease by reducing the output voltage of the photovoltaic string. To facilitate controlling, the converters may be averagely controlled. All output voltages of the converters may be reduced to a same voltage value, that is, all output voltages of n converters may be controlled, based on the first preset voltage V and a quantity n of the converters included in the at least one photovoltaic string, to decrease to V/n, where n is a positive integer greater than or equal to 2.

In a possible implementation, the controller is an inverter controller, and is configured to send a voltage control instruction to n converters in the at least one photovoltaic string. The voltage control instruction carries V/n. All the n converters control, based on V/n carried in the voltage control instruction, the output voltages to be V/n.

In a possible implementation, the controller may pull down the output current to ensure that there is no electric arc in the recovery process. To ensure that there is no electric arc, because output terminals of the converters are connected in series, currents of all the converters are equal, and the controller controls a maximum output current of each converter in the at least one photovoltaic string to be the first preset current.

In a possible implementation, to facilitate controlling, the embodiments may be implemented by the inverter, that is, the controller is an inverter controller. The controller is integrated into a cabinet of the inverter.

In a possible implementation, the controller communicates with at least two converters in a wired manner or a wireless manner. The inverter controller may be configured to send the voltage control instruction to the n converters through 485, PLC, WIFI, or ZigBee.

In a possible implementation, the controller sends a current control instruction to each converter in the photovoltaic string. Because all the converters in the photovoltaic string are connected in series, output currents of all the converters are controlled to be the same, and each converter controls the output current to be less than or equal to the first preset current.

A first preset time period and a second preset time period may be the same or may be different. This is not limited.

Based on the photovoltaic system provided above, the embodiments may further provide an inverter and a method. The following describes the inverter and the method. Advantages of the foregoing embodiments may of the photovoltaic system also be applicable to the following inverter and method.

The inverter includes an inverter controller and a power conversion circuit. An input terminal of the power conversion circuit is connected to at least one photovoltaic string. Each of the at least one photovoltaic string includes at least one converter. An input terminal of each of the at least one converter is connected to a corresponding photovoltaic module. The inverter controller is configured to: when an electric arc is detected, control an input current of the inverter to decrease to extinguish the arc; and control an output voltage of the at least one photovoltaic string to decrease to a first preset voltage, where the first preset voltage is less than an input voltage of the inverter when the electric arc is detected; or control a maximum value of an output current of the at least one photovoltaic string to be a first preset current. The first preset current is less than the input current of the inverter when the electric arc is detected.

In a possible implementation, the inverter controller is further configured to: after controlling the maximum value of the output current of the at least one photovoltaic string to be the first preset current, decrease the corresponding input voltage of the inverter to the input voltage of the inverter when the electric arc is detected.

In a possible implementation, the inverter controller is further configured to: after controlling the output voltage of the at least one photovoltaic string to decrease to the first preset voltage, increase the input current of the inverter to the corresponding input current of the inverter when the electric arc is detected.

In a possible implementation, each of the at least one photovoltaic string includes at least two converters. An input terminal of each of the at least two converters is connected to a corresponding photovoltaic module. Output terminals of the at least two converters are connected in series and connected to the input terminal of the inverter.

The inverter controller is configured to control, based on the first preset voltage V and a quantity n of converters included in the at least one photovoltaic string, all output voltages of the n converters to decrease to V/n, where n is a positive integer greater than or equal to 2.

In a possible implementation, the inverter controller is configured to send a current control instruction to each converter in the at least one photovoltaic string, to control a maximum output current of each converter in the at least one photovoltaic string to be the first preset current.

In a possible implementation, to make the photovoltaic system recover when it is determined that the detected electric arc is a false electric arc, for example, to perform maximum power tracking, electric arc confirmation control is not performed. That is, the controller is further configured to: if no electric arc is detected within a first preset time period after increasing the input current of the inverter to the input current of the inverter when the electric arc is detected, skip controlling the output voltage of the at least one photovoltaic string to decrease to the first preset voltage. Alternatively, the controller is further configured to: if no electric arc is detected within a second preset time period after decreasing the input voltage of the inverter to the input voltage of the inverter when the electric arc is detected for running, skip controlling the maximum value of the output current of the at least one photovoltaic string to be the first preset current.

The first preset time period and the second preset time period may be the same or may be different. This is not limited. The first preset time period and the second time period may be set based on a security requirement of the photovoltaic system and may be any value on the premise that security is ensured.

According to the photovoltaic system and the inverter provided above, the embodiments may further provide a direct current electric arc detection method. The method is applied to the photovoltaic system. The photovoltaic system includes the inverter and at least one converter. An input terminal of the inverter is connected to at least one photovoltaic string. Each of the at least one photovoltaic string includes at least one converter. An input terminal of each of the at least one converter is connected to a corresponding photovoltaic module. The method includes: determining whether an electric arc is detected; when the electric arc is detected, controlling an input current of the inverter to decrease to extinguish the arc; and controlling an output voltage of the at least one photovoltaic string to decrease to a first preset voltage, where the first preset voltage is less than an input voltage of the inverter when the electric arc is detected; or controlling a maximum value of an output current of the at least one photovoltaic string to be a first preset current. The first preset current is less than the input current of the inverter when the electric arc is detected.

In a possible implementation, the controlling an output voltage of the at least one photovoltaic string to decrease to a first preset voltage includes: controlling an output voltage of each converter in the at least one photovoltaic string to decrease, so that the output voltage of the at least one photovoltaic string decreases to the first preset voltage.

In a possible implementation, the controlling a maximum value of an output current of the at least one photovoltaic string to be a first preset current includes: controlling an output current of each converter in the at least one photovoltaic string to be less than or equal to the first preset current.

The photovoltaic system provided above uses an example in which the inverter is used to the field of photovoltaic power generation. In addition, the embodiments may also be applied to electric arc detection in another scenario. The embodiments may further provide a power system, including an inverter, a controller, and at least two converters. An input terminal of the inverter is connected to at least one direct current power source. Each of the at least one direct current power source includes at least two converters. Output terminals of the at least two converters are connected in series and connected to the input terminal of the inverter. The DC power source can be generated from PV, hydropower, or wind power. The controller is configured to: when an electric arc characteristic is detected, control an input current of the inverter to decrease to extinguish the arc. The inverter recovers in any one of the following manners. If the inverter can recover, it indicates that there is no electric arc. Otherwise, it indicates that there is an electric arc. Any one of the following manners includes: controlling an output voltage of at least one photovoltaic string to decrease to a first preset voltage, and controlling the input current of the inverter to be a second preset current, where the first preset voltage is less than an input voltage of the inverter when the electric arc characteristic is detected; or controlling an output current of at least one photovoltaic string to decrease to a first preset current, and controlling an input voltage of the inverter to be a second preset voltage, where the first preset current is less than the input current of the inverter when the electric arc characteristic is detected.

The embodiments may have at least the following advantages:

When the inverter detects the electric arc characteristic, the inverter controller first controls the input current to decrease to extinguish the arc. For example, the inverter controller may control the input current to decrease to zero. In this case, the output current of the photovoltaic string is 0, and each photovoltaic module operates at an operating point corresponding to an open-circuit voltage, that is, the voltage during arc extinguishing is high. Whether an electric arc really occurs may be verified by using the following two solutions. If the photovoltaic system can recover, it indicates that no electric arc fault occurs. If the photovoltaic system cannot recover, it indicates that the electric arc fault really occurs. In a first solution, on the basis that the input current of the inverter continues to be an input current during arc extinguishing, the output voltage of the photovoltaic string is controlled to decrease to the first preset voltage, where the first preset voltage is less than the input voltage of the inverter when the electric arc is detected. In other words, the output voltage of the photovoltaic string is pulled down, to avoid causing the electric arc again in an electric arc confirmation process. In a second solution, on the basis that the input voltage of the inverter is a corresponding voltage during arc extinguishing, the output current of the photovoltaic string is controlled to decrease to the first preset current, where the first preset current is less than the input current of the inverter when the electric arc is detected. In other words, the current is pulled down to determine whether the electric arc really occurs. Because the current decreases in the recovery process, no electric arc is caused again in the confirmation process. Regardless of a voltage pull-down manner or a current pull-down manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

DETAILED DESCRIPTION OF THE EMBODIMENTS

The following describes the solutions in the embodiments with reference to the accompanying drawings.

The following terms "first", "second", and the like are merely intended for a purpose of description and shall not be understood as an indication or implication of relative importance or implicit indication of a quantity of indicated characteristics. Therefore, a characteristic limited by "first", "second", or the like may explicitly or implicitly include one or more characteristics. In the descriptions, unless otherwise stated, "a plurality of" means two or more than two.

The term "connection" should be understood in a broad sense unless otherwise expressly specified and limited. For example, the "connection" may be a fixed connection, may be a detachable connection, may be an integral connection; may be a direct connection, or may be an indirect connection implemented by using a medium. In addition, a term "coupling" may be a manner of implementing an electrical connection for signal transmission. The "coupling" may be a direct electrical connection or may be an indirect electrical connection through an intermediate medium.

To enable a person skilled in the art to better understand the embodiments, the following first describes an application scenario with reference to the accompanying drawings.

Photovoltaic System Embodiment

This embodiment relates to a photovoltaic system. Generally, the photovoltaic system includes an inverter and a plurality of photovoltaic strings. The plurality of photovoltaic strings is connected to an input terminal of the inverter. The photovoltaic string includes a plurality of photovoltaic modules. To more flexibly configure the photovoltaic module in the photovoltaic string, each photovoltaic module may be connected to a converter, that is, an input terminal of the converter is connected to a corresponding photovoltaic module. A voltage of the photovoltaic module is an input voltage of the converter. The converter may adjust the input voltage thereof to adjust the voltage of the photovoltaic module. Generally, the converter is a direct current/direct current (DC/DC) converter. The DC/DC converter may include a boost circuit, a buck circuit, or a buck-boost circuit. The converter connected to the photovoltaic module is also referred to as an optimizer in the photovoltaic system.

The converter generally operates in a maximum power point tracking (MPPT) mode.

MPPT mode: In normal cases, the converter only controls the input voltage to operate at a maximum power point voltage (Vmpp) of the photovoltaic module to achieve a maximum output power of the photovoltaic module and does not control an output voltage.

The following describes an architecture of a photovoltaic system provided in this embodiment.

Figure 1:
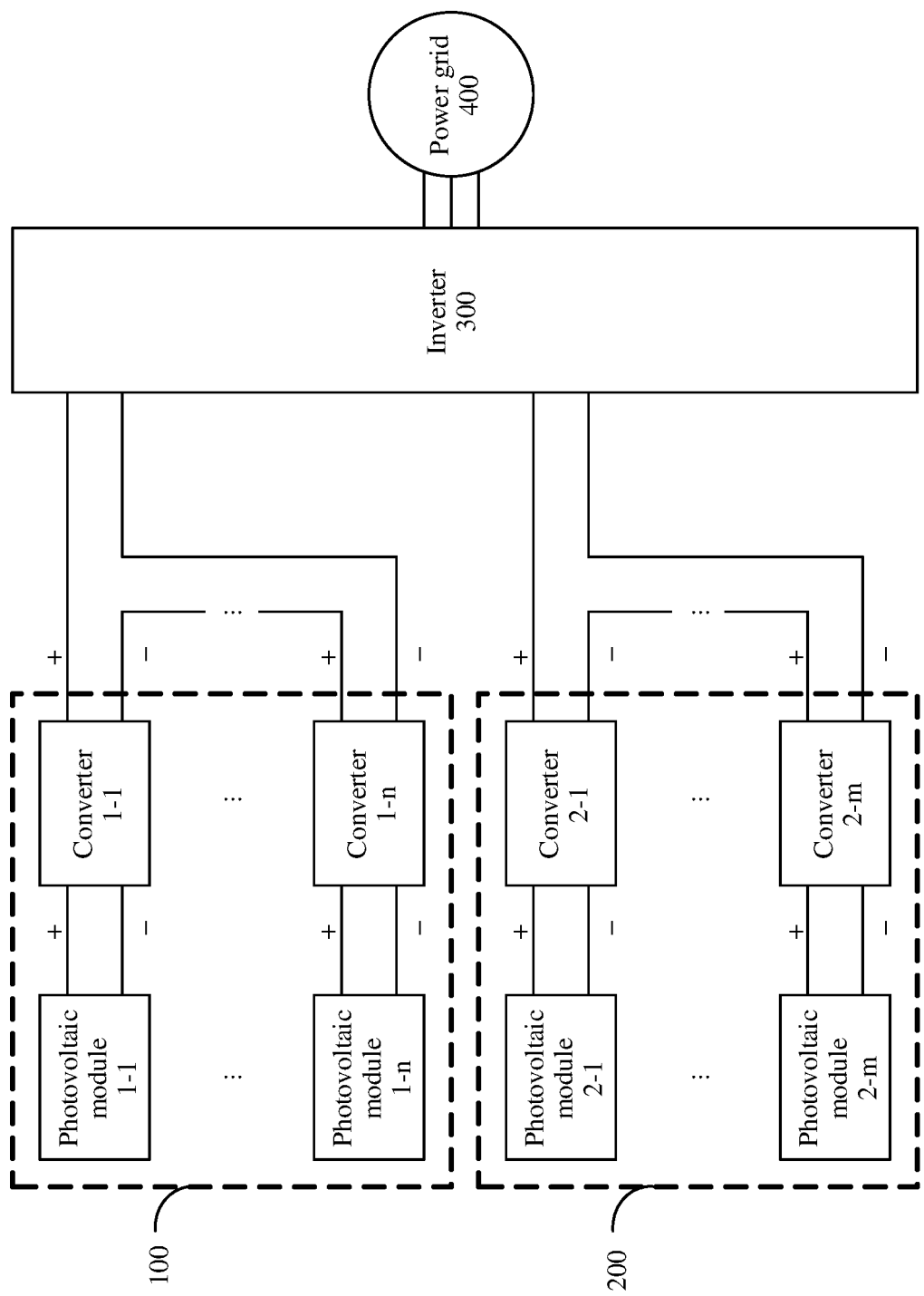
FIG. 1 is a schematic diagram of a photovoltaic system according to an embodiment.

FIG. 1 is a schematic diagram of a photovoltaic system according to an embodiment.

For ease of description, this embodiment is described by using an example in which the photovoltaic system includes at least two photovoltaic strings: a first photovoltaic string 100 and a second photovoltaic string 200. In an actual product, an input terminal of an inverter 300 may be connected to more photovoltaic strings, which are not limited to two photovoltaic strings. It should be understood that, for a low-power photovoltaic system, the input terminal of the inverter 300 may also be connected to one photovoltaic string.

It can be seen from FIG. 1 that the first photovoltaic string 100 includes n photovoltaic modules. The second photovoltaic string 200 includes m photovoltaic modules. Both m and n are integers greater than or equal to 2, and m and n may be different integers. It should be understood that m and n may also be same integers, that is, when m and n are equal, the two photovoltaic strings include a same quantity of converters. For ease of description, to easily distinguish between the first photovoltaic string 100 and the second photovoltaic string 200, an example in which m and n are different integers is used for description in this embodiment. In other words, the first photovoltaic string 100 and the second photovoltaic string 200 include different quantities of photovoltaic modules, that is, include different quantities of converters.

It should be understood that in this embodiment, each photovoltaic string may alternatively include only one converter. For ease of understanding, an example in which each photovoltaic string includes a plurality of converters is used for description in embodiments.

An input terminal of a converter 1-1 in the first photovoltaic string 100 is connected to a photovoltaic module 1-1. An input terminal of a converter 1-n is connected to a photovoltaic module 1-n. Output terminals of the converter 1-1 to the converter 1-n are connected in series and connected to the input terminal of the inverter 300.

Similarly, an input terminal of a converter 2-1 in the second photovoltaic string 200 is connected to a photovoltaic module 2-1. An input terminal of a converter 2-m is connected to a photovoltaic module 2-m. Output terminals of the converter 2-1 to the converter 2-*m* are connected in series and connected to the input terminal of the inverter 300.

The inverter 300 may include two stages, or may include one stage, that is, the inverter 300 may be a string inverter, or may be a centralized inverter.

When the inverter 300 internally includes two stages, a DC/DC circuit and a direct current/alternating current (DC/AC) circuit are included. The inverter may include a plurality of DC/DC circuits. The plurality of DC/DC circuits one-to-one correspond to a plurality of photovoltaic strings. Alternatively, one DC/DC circuit may correspond to a plurality of photovoltaic strings. For example, one DC/DC circuit corresponds to two photovoltaic strings. An output terminal of each photovoltaic string is connected to an input terminal of the corresponding DC/DC circuit. All output terminals of the plurality of DC/DC circuits are connected to an input terminal of the DC/AC circuit. In other words, the output terminals of the plurality of DC/DC circuits are connected in parallel to the input terminal of the DC/AC circuit.

The inverter in the photovoltaic system in this embodiment is a single-stage inverter, that is, includes only a DC/AC circuit, and does not include a DC/DC circuit.

An output terminal of the inverter 300 is connected to a power grid 400. Generally, the inverter 300 is a three-phase inverter, and the power grid 400 is a three-phase alternating current power grid. Alternatively, the inverter 300 may be a single-phase inverter for household use, and the corresponding power grid 400 is an alternating current power grid for household use.

Figure 2:
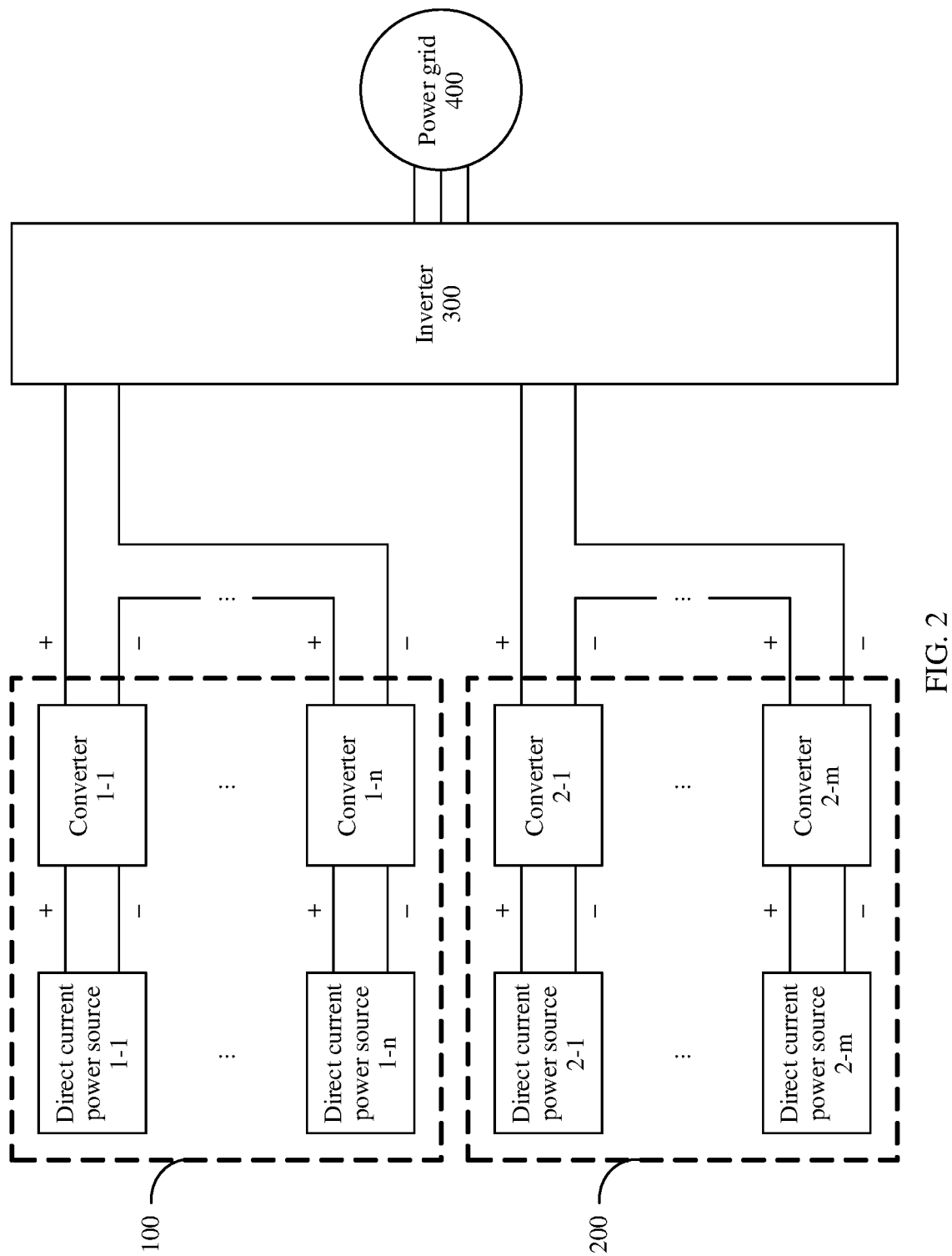
FIG. 2 is a schematic diagram of a power system according to an embodiment.

It should be understood that the direct current electric arc detection solution provided in this embodiment is not only applicable to the photovoltaic system, but also applicable to any scenario in which a direct current power source is used. The photovoltaic module in the photovoltaic system may be replaced with any other direct current power source, for example, wind power, hydropower, or a battery. As shown in FIG. 2, a difference between FIG. 2 and FIG. 1 lies only in that the photovoltaic module in FIG. 1 is replaced with the direct current power source in FIG. 2, and other parts are the same. Details are not described herein again.

In actual operation, because the power system includes a converter, the converter includes a controllable switching transistor, and a switching frequency of the controllable switching transistor is high, high-frequency noise or ambient noise of the converter may be similar to a spectrum characteristic of an electric arc. As a result, whether an electric arc fault really occurs cannot be effectively distinguished. The inverter needs to further perform electric arc confirmation when detecting the electric arc characteristic, to avoid false reporting of the electric arc fault. In this embodiment, based on a detected electric arc characteristic, whether the electric arc fault really occurs needs to be further confirmed, to prevent false reporting of the electric arc fault.

In this embodiment, when the inverter detects the electric arc characteristic, the inverter controls an input current to decrease to extinguish the arc. For example, the inverter may control the input current to be zero. In this case, an output current of the photovoltaic string is 0, and each photovoltaic module operates at an operating point corresponding to an open-circuit voltage. Then, an output voltage of the photovoltaic string is controlled to decrease to a preset voltage. Each converter is controlled to decrease an output voltage thereof. In a possible implementation, an output current of the converter may be recovered to an output current at an operating point when the electric arc characteristic is detected. If the output current may be recovered, it indicates that no electric arc fault occurs. If the output current may not be recovered, it indicates that the electric arc fault really occurs. In addition, the output current of the photovoltaic string is controlled to decrease to a preset current. Each converter is controlled to decrease the output current thereof. In a possible implementation, the output voltage of the converter is recovered to an output voltage at the operating point when the electric arc characteristic is detected. If the output voltage may be recovered, it indicates that no electric arc fault occurs. If the output voltage may not be recovered, it indicates that the electric arc fault really occurs.

The following describes in detail the photovoltaic system provided in this embodiment with reference to the accompanying drawings.

Figure 3:
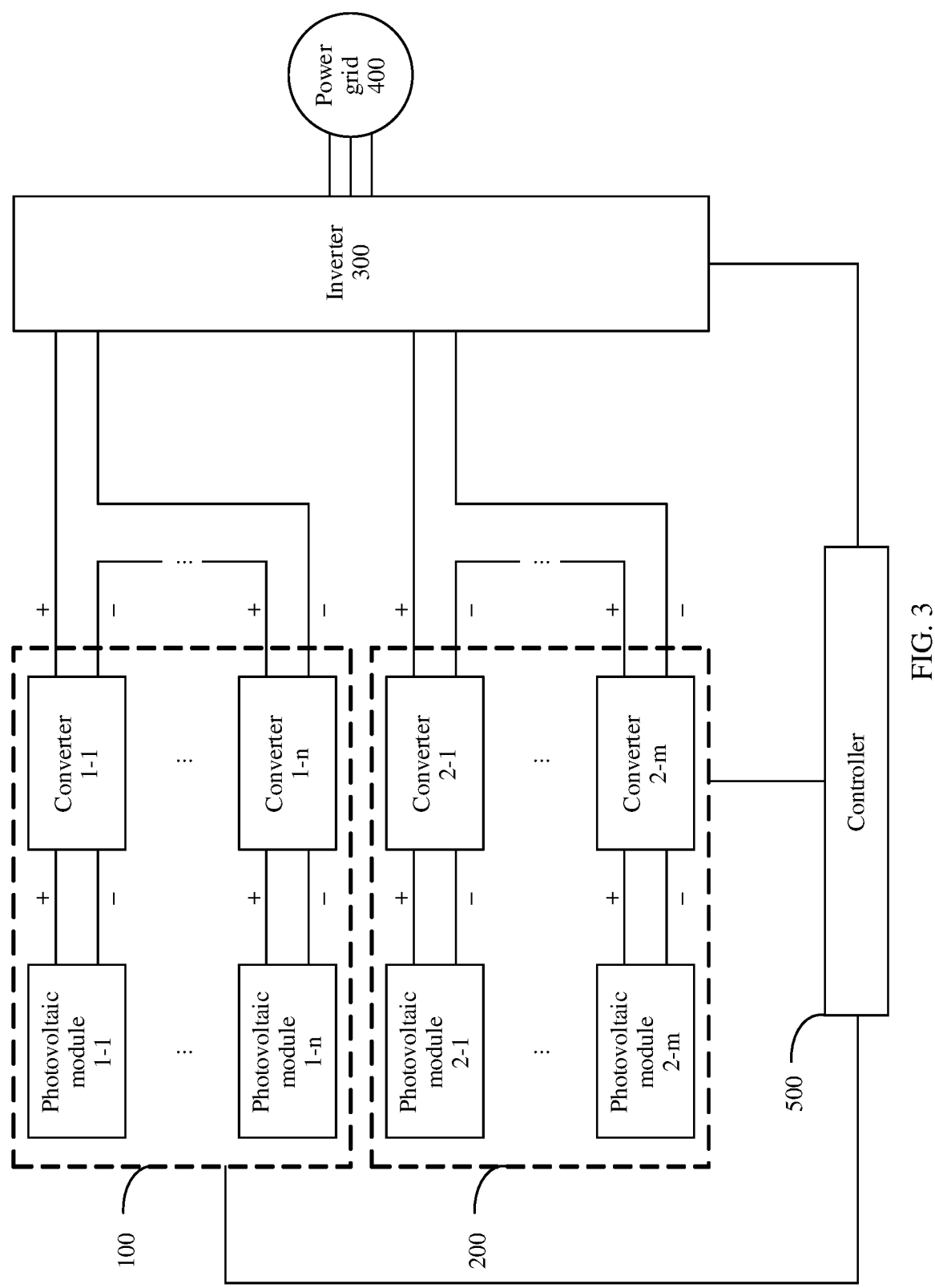
FIG. 3 is a schematic diagram of another photovoltaic system according to an embodiment.

FIG. 3 is a schematic diagram of another photovoltaic system according to an embodiment.

This embodiment provides the photovoltaic system, including the inverter 300, a controller 500, and at least two converters.

The input terminal of the inverter 300 is connected to at least one photovoltaic string. Each of the at least one photovoltaic string includes at least two converters. An input terminal of each of the at least two converters is connected to a corresponding photovoltaic module, and output terminals of the at least two converters are connected in series and connected to the input terminal of the inverter. As shown in FIG. 3, for example, the input terminal of the inverter 300 is connected to two photovoltaic strings. In other words, the first photovoltaic string 100 and the second photovoltaic string 200 include different quantities of photovoltaic modules, that is, include different quantities of converters.

An input terminal of a converter 1-1 in the first photovoltaic string 100 is connected to a photovoltaic module 1-1. An input terminal of a converter 1-*n* is connected to a photovoltaic module 1-*n*. Output terminals of the converter 1-1 to the converter 1-*n* are connected in series and connected to the input terminal of the inverter 300. Similarly, an input terminal of a converter 2-1 in the second photovoltaic string 200 is connected to a photovoltaic module 2-1. An input terminal of a converter 2-*m* is connected to a photovoltaic module 2-*m*. Output terminals of the converter 2-1 to the converter 2-*m* are connected in series and connected to the input terminal of the inverter 300.

The inverter 300 may internally include two stages of power conversion circuits, that is, a DC/DC circuit and a DC/AC circuit; or may include only one stage of power conversion circuit, that is, include only a DC/AC circuit. An implementation of the inverter 300 has been described above with reference to FIG. 1, and details are not described herein again.

The controller 500 is configured to: when the electric arc characteristic is detected, control the input current of the inverter to decrease to extinguish the arc, for example, decrease the input current of the inverter to 0 to extinguish the arc. In this embodiment, the input current of the inverter is not limited to decrease to 0 and may be a low current for extinguishing the arc. After the arc is extinguished, an output voltage of the at least one photovoltaic string is controlled to decrease to a first preset voltage, where the first preset voltage is less than an input voltage of the inverter when an electric arc is detected; or a maximum value of an output current of the at least one photovoltaic string is controlled to be a first preset current. The first preset current is less than the input current of the inverter when the electric arc is detected.

The controller 500 may determine, in two manners, whether the electric arc really occurs. In a first manner, on the basis that the input current of the inverter is a current during arc extinguishing, that is, the input current of the inverter is low and does not increase from the current during arc extinguishing, the output voltage of the photovoltaic string is reduced to the first preset voltage. In a second manner, after the arc is extinguished, the maximum value of the output current of the at least one photovoltaic string is controlled to be the first preset current. In the foregoing two manners, if the system can successfully recover, it indicates that there is no electric arc, and the detected electric arc characteristic is caused by another reason. If the system cannot successfully recover, it indicates that the electric arc really occurs, and the detected electric arc characteristic is caused by a true electric arc. In the two manners described in this embodiment, the first manner is that the voltage is pulled down. When the voltage is low, no electric arc is caused regardless of a high current. In other words, the pull-down voltage is a safe voltage. This ensures that the electric arc is not caused. The second manner is that the pull-down current is low enough, that is, at the pull-down current, the electric arc is not caused regardless of a high voltage.

The first preset voltage is less than the input voltage of the inverter when the electric arc characteristic is detected. The first preset current is less than the input current of the inverter when the electric arc characteristic is detected. A value of the first preset voltage is not limited in this embodiment. The first preset voltage may be set based on an actual voltage level of the photovoltaic system. In addition, the first preset voltage may be set according to a standard. For example, when the voltage described in the standard is less than 80 V, electric arc detection is not required. Therefore, even if the electric arc occurs, the electric arc may be extinguished by itself. It should be understood that the first preset voltage in this embodiment may be less than 80 V, or may be greater than 80 V, provided that it is ensured that no electric arc is generated at the first preset voltage. In addition, the first preset voltage is usually less than a voltage corresponding to the operating point when the electric arc characteristic is detected. Because the operating point when the electric arc characteristic is detected is usually an MPPT operating point, the corresponding voltage is high. After the arc of the photovoltaic system is extinguished, if the output voltage of the photovoltaic string recovers to the voltage when the electric arc characteristic is detected, because the voltage is excessively high, if the electric arc fault really exists, the electric arc may recur due to the excessively high voltage, that is, secondary arcing may occur. Consequently, the fault spreads and an electrical fire is caused.

Similarly, the first preset current provided in this embodiment may also be a current that does not pull up the electric arc. A value of the first preset current is not limited in this embodiment. Generally, the first preset current is less than a current corresponding to the operating point at which the electric arc characteristic is detected. Therefore, the operating point at which the electric arc characteristic is detected is usually an MPPT operating point, and the corresponding current is high. After the arc of the photovoltaic system is extinguished, if the output current of the photovoltaic string recovers to the current when the electric arc characteristic is detected, because the current is excessively high, if the electric arc fault really exists, the electric arc may recur due to the excessively high current, that is, secondary arcing may occur. Consequently, the fault spreads and an electrical fire is caused.

According to the photovoltaic system provided in this embodiment, electric arc confirmation may be performed in two manners when the electric arc characteristic is detected. A first manner is to control the output voltage of the photovoltaic string to be the first preset voltage and then increase the input current of the inverter to a second preset current. A second manner is to control the maximum value of the output current of the photovoltaic string to be the first preset current and then decrease the input voltage of the inverter to a second preset voltage. If the photovoltaic system can successfully recover, it indicates that no true electric arc exists. If the photovoltaic system cannot recover, it indicates that the true electric arc exists. Regardless of the first manner or the second manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

When the voltage is pulled down, the controller is further configured to: after controlling the output voltage of the at least one photovoltaic string to decrease to the first preset voltage, increase the input current of the inverter from an input current of the inverter after the arc is extinguished.

For example, when controlling the output voltage of the at least one photovoltaic string to decrease to the first preset voltage, the controller is further configured to control the input current of the inverter to be the corresponding input current of the inverter when the electric arc is detected.

When the current is pulled down, the controller is further configured to: after controlling the maximum value of the output current of the at least one photovoltaic string to be the first preset current, decrease the input voltage of the inverter from an input voltage of the inverter during arc extinguishing.

For example, after controlling the maximum value of the output current of the at least one photovoltaic string to be the first preset current, the controller is further configured to control the input voltage of the inverter to be the corresponding input voltage of the inverter when the electric arc is detected.

For ease of description, the second preset current is the input current of the inverter when the electric arc is detected. The second preset voltage is the input voltage of the inverter when the electric arc is detected. When detecting the electric arc, the controller may first record a current operating point of the photovoltaic string, that is, record a current output voltage and output current of the photovoltaic string. It should be understood that the output voltage and the output current herein are an output voltage and an output current that are obtained after the converter is connected in series. For ease of understanding, the following embodiment is described by using an example in which the second preset current is the input current of the inverter when the electric arc is detected, and the second preset voltage is the input voltage of the inverter when the electric arc is detected. It should be understood that the second preset current may alternatively be another current value and may be less than the input current of the inverter when the electric arc characteristic is detected, provided that the second preset current is greater than the current during arc extinguishing. Similarly, the second preset voltage may alternatively be another voltage value and may be less than the input voltage of the inverter when the electric arc is detected.

In addition, there is no relationship between the first preset voltage and the second preset voltage, and there is no relationship between the second preset current and the first preset current. The first preset voltage and the second preset voltage are voltages in two different implementation solutions. The second preset current and the first preset current are currents in two different implementation solutions.

To make a person skilled in the art better understand advantages of the embodiments, the following compares and describes diagrams of current-voltage (IV) curves of the photovoltaic string.

Figure 4:
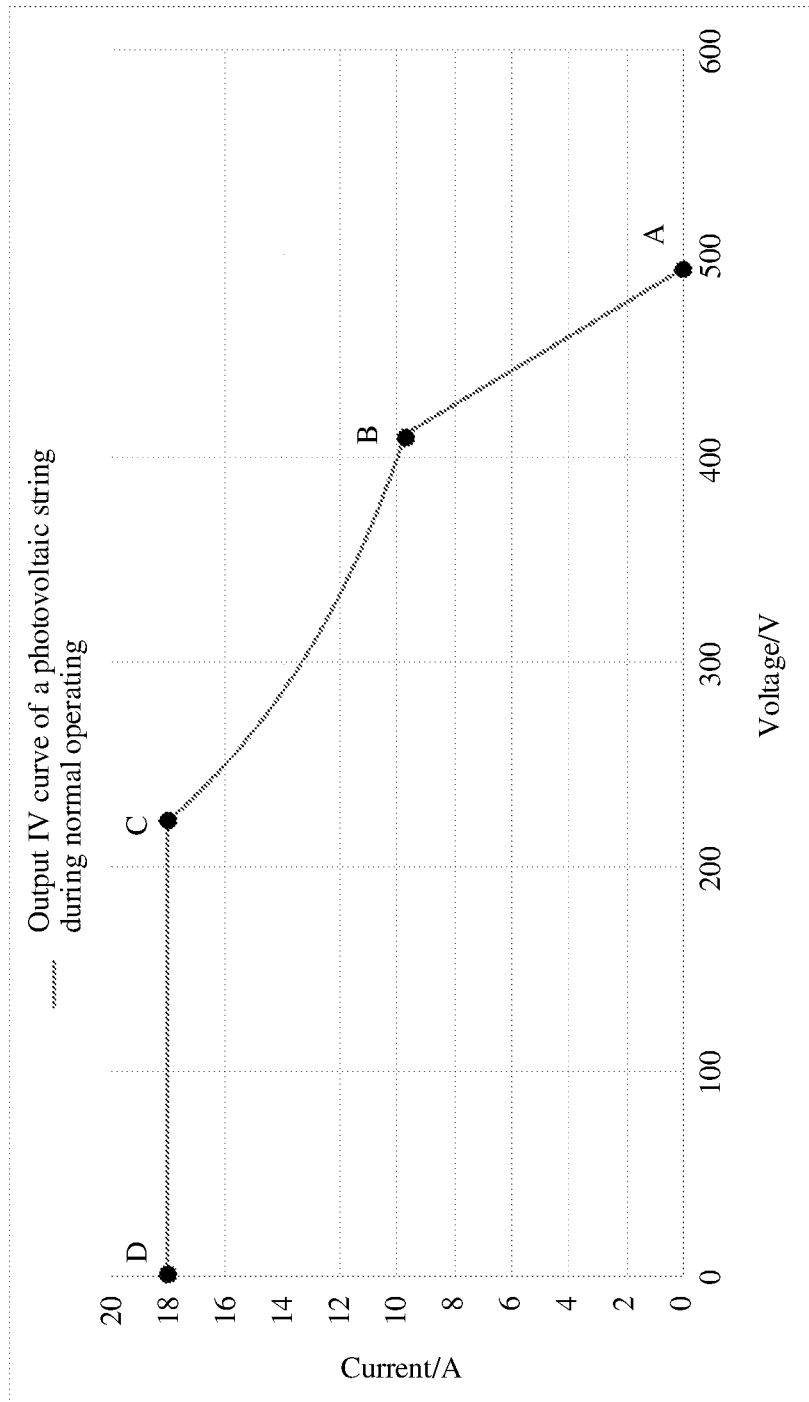
FIG. 4 is a diagram of an IV curve of a photovoltaic string during normal operating.

FIG. 4 is a diagram of an IV curve of the photovoltaic string during normal operation.

In this embodiment, an example in which each photovoltaic string includes 10 serially-connected photovoltaic modules is used for description. For ease of description, all the photovoltaic modules have the same parameters. Details are as follows: The open-circuit voltage $V_{OC}$ is 49.3 V, a short-circuit current $I_{SC}$ is 10.47 A, a voltage at maximum power VMP is 40.6 V, and a current at maximum power IMP is 9.86 A. The output IV curve of the photovoltaic string obtained through voltage or current control by the converter is shown in FIG. 4. An optimal operating point of the inverter is a point B. In this case, the output voltage of each converter is 40.6 V, and the output current of each converter is 9.86 A. An output voltage of the entire photovoltaic string at the point B is a sum 406 V of output voltages of the 10 photovoltaic modules, and an output current of the entire photovoltaic string is an output current 9.86 A of each photovoltaic module.

When the inverter detects the electric arc characteristic, the inverter records a current operating point B (406 V/9.86 A). The inverter reduces the input current to extinguish the arc. For example, the input current is controlled to be zero. In this case, an operating point of the photovoltaic string is a point A (493 V/0 A), that is, the operating point corresponding to the open-circuit voltage. In a conventional technology, the inverter recovers to the point B, and determines whether the electric arc fault occurs. If the inverter can recover to the point B for operating, it indicates that the inverter may mistakenly detect the electric arc characteristic due to high-frequency noise, ambient noise, or the like of a converter in a photovoltaic system, and the inverter can continue to normally operate. If the inverter cannot recover to the point B, it indicates that a direct current electric arc fault occurs in the photovoltaic system, and the inverter generates an alarm about the direct current electric arc fault. The foregoing is a process of determining an electric arc fault by an inverter in the conventional technology. Because a voltage and a current when the inverter recovers to the point B are large, an electric arc is easily caused for the second time, and the fault is further escalated. A point C and a point D in the IV curve are not involved in this embodiment, and therefore are not described in detail.

In this embodiment, in an electric arc confirmation process, the photovoltaic string is controlled to output a low voltage or a low current, which is within a safe range. Therefore, no electric arc is caused for the second time. In addition, in this embodiment, when the controller determines the electric arc, the inverter delivers a control instruction to each converter, and each converter controls the output voltage or output current thereof, to control the output voltage or the output current of the photovoltaic string. The controller may communicate with at least two converters in a wired manner or in a wireless manner. The wired manner includes at least one of the following: 485 or PLC. The wireless manner includes at least one of the following: WIFI or ZigBee. The inverter controller is configured to send a voltage control instruction or a current control instruction to n converters through 485, PLC, WIFI, or ZigBee. For example, the voltage control instruction carries a first preset voltage, and the current control instruction carries the first preset current. With continuous development of communication technologies, the inverter and the converter may further communicate with each other in another communication manner. With an increasingly high communication rate, such as an increase in a wireless communication rate, when communication between the inverter and the converter is fast, according to this embodiment, electric arc confirmation can be completed within a short time period, and a duration is very short, so that normal operation of the inverter is not affected.

With reference to the accompanying drawings, the following describes in detail two electric arc confirmation manners provided in this embodiment on. First, the first implementation is described.

In a first manner, the controller first limits the output voltage of the photovoltaic string, and then pulls up the output current.

The controller controls the output voltage of each converter in the at least one photovoltaic string to decrease, so that the output voltage of the at least one photovoltaic string decreases to the first preset voltage. The first preset voltage is less than the input voltage when the electric arc characteristic is detected. It should be understood that, when the photovoltaic system provided in this embodiment includes a plurality of photovoltaic strings, the output voltage of each photovoltaic string may be separately controlled, to determine whether the electric arc really occurs. A confirmation mechanism provided in the following embodiment refers to any one of the photovoltaic strings.

It should be understood that, when the controller confirms the electric arc, the controller only needs to control the output voltage of the photovoltaic string to decrease to the first preset voltage and may control the output voltage of the converter to decrease. When one photovoltaic string includes n converters, n is a positive integer greater than or equal to 2. Output voltages of the n converters may be the same or may be different. This is not limited in this embodiment. To facilitate controlling and description, this embodiment is described by using an example in which the output voltages of the n converters are the same, that is, the n converters have equal voltages. The controller may control, based on the first preset voltage V and a quantity n of converters included in the at least one photovoltaic string, all output voltages of the n converters to decrease to V/n.

The following uses equal voltages of the n converters as an example for description.

Figure 5:
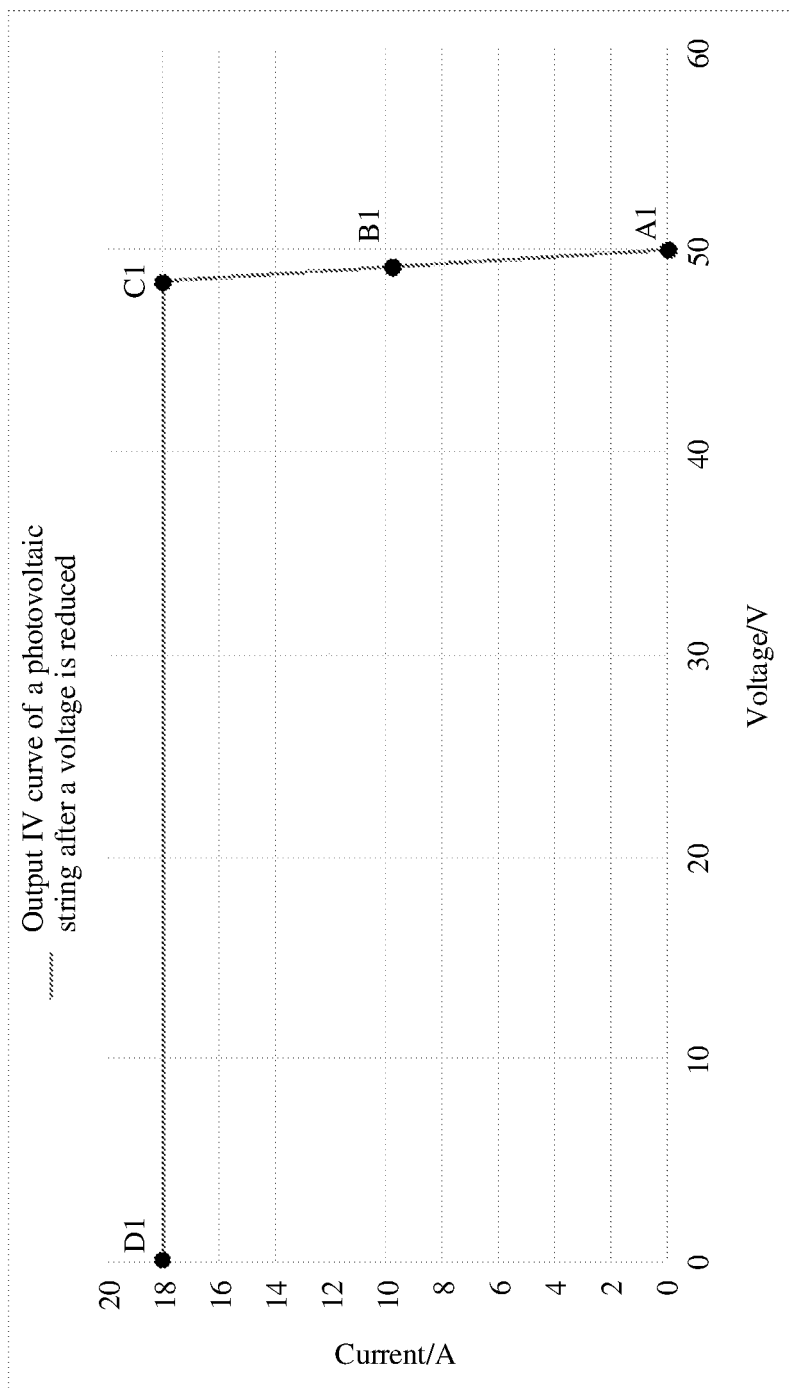
FIG. 5 is an IV curve of a photovoltaic string during electric arc confirmation according to an embodiment.

FIG. 5 is an IV curve of the photovoltaic string during electric arc confirmation according to an embodiment.

In this embodiment, an example in which one photovoltaic string includes 10 serially-connected photovoltaic modules is still used for description. All the photovoltaic modules have the same parameters. Details are as follows: The open-circuit voltage $V_{OC}$ is 49.3 V, the short-circuit current $I_{SC}$ is 10.47 A, the MPP voltage at maximum power $V_{MP}$ is 40.6 V, and the MPP current at maximum power $I_{MP}$ is 9.86 A. The output current-voltage curve (IV curve) of the photovoltaic string obtained through voltage or current control by the converter is shown in FIG. 5. The optimal operating point of the inverter is the point B. In this case, the output voltage of each converter is 40.6 V, and the output current of each converter is 9.86 A.

When detecting the electric arc characteristic, the controller performs the following electric arc confirmation process:

The controller records the current operating point B (406 V/9.86 A).

The controller controls the input current of the inverter to be zero to extinguish the arc. In this case, the operating point is a point A (493 V/0 A).

The controller controls the converter to decrease the output voltage of the photovoltaic string. For example, the controller controls the output voltage of the photovoltaic string to decrease from the open-circuit voltage to 50 V. Because the photovoltaic string includes 10 serially-connected converters, the output voltage of each converter is controlled to be 50 V/10=5 V. In this case, the IV curve of the photovoltaic string obtained through voltage or current control by the converter is shown in FIG. 5, that is, the inverter operates at a point A1 (50 V/0 A).

The controller recovers the input current of the inverter to the operating current (9.86 A) at the operating point B when the electric arc characteristic is detected, where the operating point B corresponds to a point B1 in the IV curve in FIG. 5. Whether the direct current electric arc fault occurs is confirmed as follows: If the operating current at the point B1 can be recovered, in this case, the inverter operates at the point B1 (49.2 V/9.86 A), it indicates that the high-frequency noise, the ambient noise, or the like of the converter in the photovoltaic system causes the controller to mistakenly detect the electric arc characteristic, the converter is controlled to recover the IV curve shown in FIG. 4, and the inverter normally operates. If the inverter cannot recover to the point B1 for operating, it indicates that the direct current electric arc fault really occurs in the photovoltaic system, and the inverter generates an alarm about the direct current electric arc fault.

According to the photovoltaic system provided in this embodiment, when the controller controls the current of the photovoltaic string to be recovered to the current when the electric arc characteristic is detected, the voltage of the corresponding point B1 is only 49.2 V, and the voltage is low, so that the low voltage does not cause secondary arcing. Therefore, the electrical fire caused by fault spreading can be avoided.

The following describes another electric arc confirmation manner provided in this embodiment.

The controller is configured to control a maximum output current of each converter in the at least one photovoltaic string to be the first preset current, that is, limit a current output capability of the converter, so that the output current is less than or equal to the first preset current. Regardless of how the output voltage is controlled, the output current of the photovoltaic string does not exceed the first preset current, so that no secondary electric arc is caused.

Figure 6:
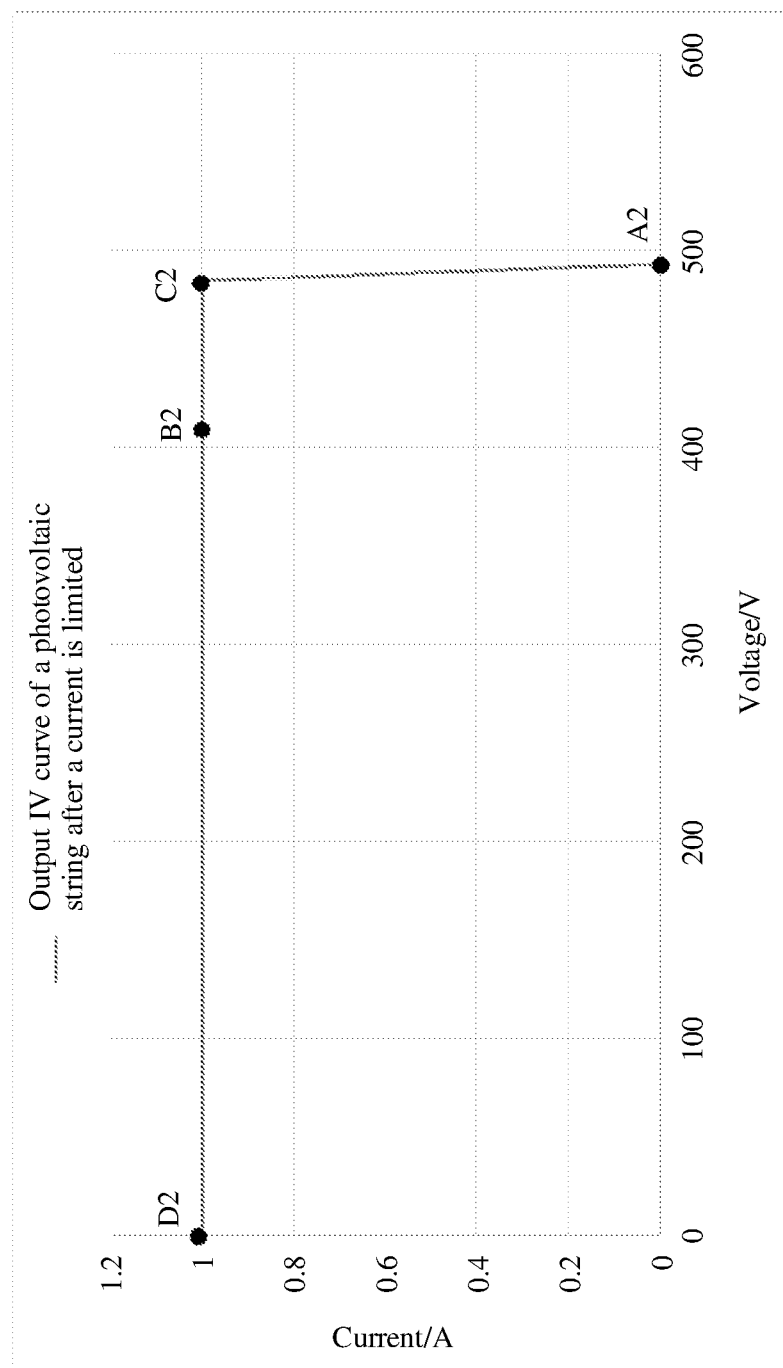
FIG. 6 is another IV curve of a photovoltaic string during electric arc confirmation according to an embodiment.

FIG. 6 is another IV curve of the photovoltaic string during electric arc confirmation according to an embodiment.

In this embodiment, an example in which one photovoltaic string includes 10 serially-connected photovoltaic modules is still used for description. All the photovoltaic modules have the same parameters. Details are as follows: The open-circuit voltage $V_{OC}$ is 49.3 V, the short-circuit current $I_{SC}$ is 10.47 A, the MPP voltage at maximum power $V_{MP}$ is 40.6 V, and the MPP current at maximum power $I_{MP}$ is 9.86 A. The output current-voltage (IV) curve of the photovoltaic string obtained through voltage or current control by the converter is shown in FIG. 6. The optimal operating point of the inverter is the point B. In this case, the output voltage of each converter is 40.6 V, and the output current of each converter is 9.86 A.

When detecting the electric arc characteristic, the controller performs the following electric arc confirmation process.

The controller records the current operating condition point B (406 V/9.86 A).

The controller controls the input current of the inverter to be zero to extinguish the arc. In this case, the inverter operates at the point A (493 V/0 A).

In the following electric arc confirmation process, the converter is controlled to decrease the current. For example, if the current of the string is limited to 1 A, each converter outputs a maximum current of 1 A. In this case, the IV curve of the photovoltaic string obtained through voltage or current control by the converter is shown in FIG. 6, that is, the inverter operates at a point A2 (493 V/0 A) in this case.

The operating voltage (406 V) at the operating condition point B is recovered, the point B corresponds to a point B2 in the IV curve in FIG. 6. Whether the direct current electric arc fault occurs is confirmed as follows: If the current can be recovered to a current limit value 1 A after the operating voltage at the point B is recovered, in this case, the inverter operates at the point B2 (406 V/1 A), it indicates that the high-frequency noise, the ambient noise, or the like of the converter in the photovoltaic system causes the inverter to mistakenly detect the electric arc characteristic, the converter is controlled to recover the IV curve shown in FIG. 4, and the inverter normally operates. If the inverter cannot recover to the point B2 for operating, it indicates that the direct current electric arc fault occurs in the photovoltaic system, and the inverter generates an alarm about the direct current electric arc fault.

The corresponding current of the point B2 is only 1 A, so that the low current does not cause secondary arcing. Therefore, the electrical fire caused by fault spreading is avoided.

In the photovoltaic system provided in the embodiments, the controller may be integrated into a cabinet of the inverter or may be located outside the cabinet of the inverter. The controller may be implemented by the inverter controller or may be a controller disposed independently of the inverter controller. This is not limited in this embodiment.

The foregoing embodiments are applicable to various topologies of the inverter and are separately described below with reference to the accompanying drawings.

In the first manner, the inverter internally includes a plurality of DC/DC circuits, and the plurality of DC/DC circuits inside the inverter one-to-one correspond to the plurality of photovoltaic strings.

Figure 7:
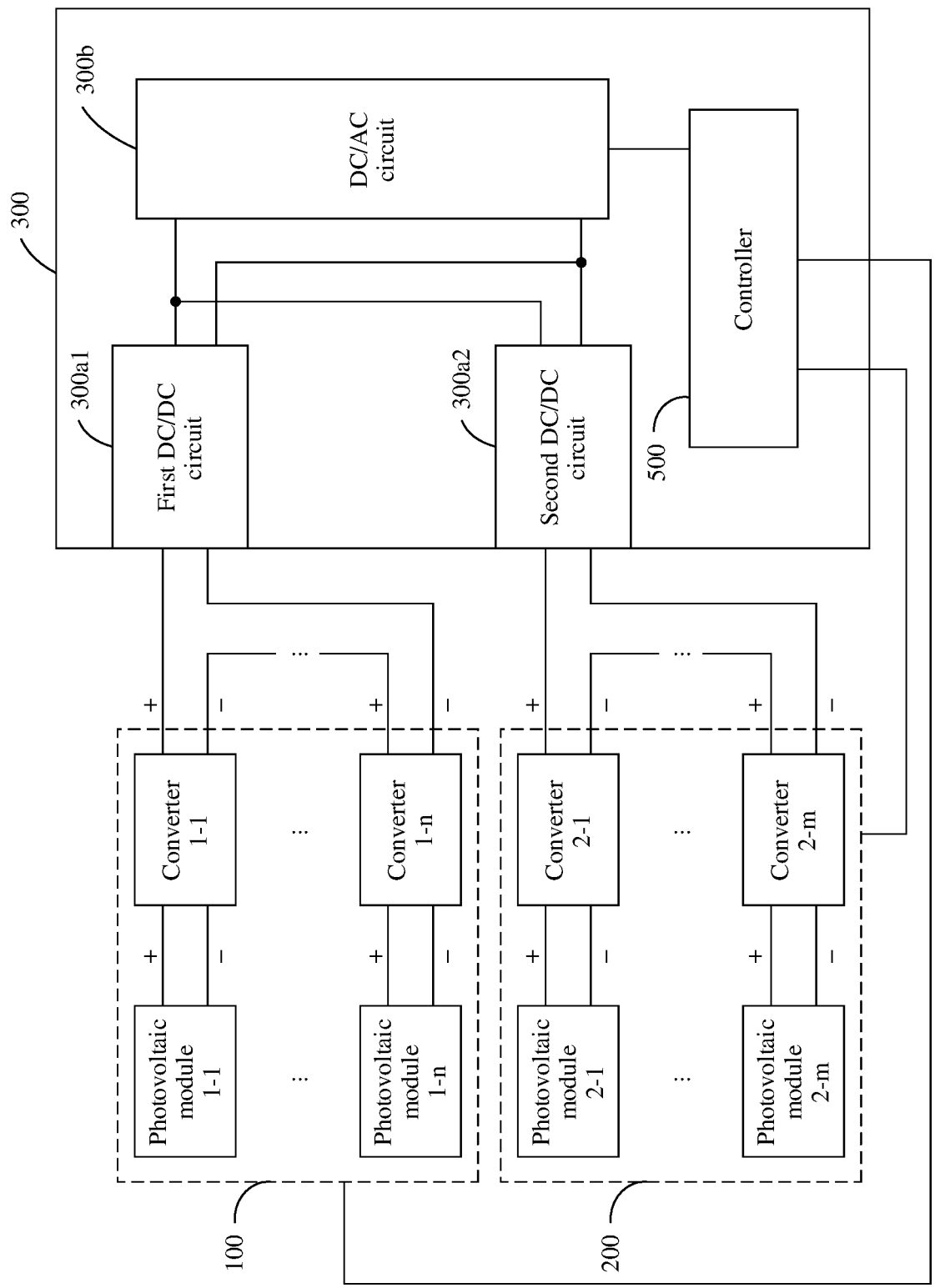
FIG. 7 is a schematic diagram of still another photovoltaic system according to an embodiment.

FIG. 7 is a schematic diagram of still another photovoltaic system according to an embodiment.

The inverter 300 in the photovoltaic system provided in this embodiment includes the plurality of DC/DC circuits. For ease of description, the following provides description by using an example in which the inverter 300 includes at least the following two DC/DC circuits: a first DC/DC circuit 300a1 and a second DC/DC circuit 300a2.

In this embodiment, an example in which the controller 500 is located inside the inverter 300 is used for description. The controller 500 of the inverter 300 may communicate with the converter in each photovoltaic string.

As shown in FIG. 7, the first photovoltaic string 100 corresponds to the first DC/DC circuit 300a1. An output terminal of the first photovoltaic string 100 is connected to an input terminal of the first DC/DC circuit 300a1. The second photovoltaic string 200 corresponds to the second DC/DC circuit 300a2. An output terminal of the second photovoltaic string 200 is connected to the second DC/DC circuit 300a2.

In addition, output terminals of the first DC/DC circuit 300a1 and the second DC/DC circuit 300a2 are connected in parallel and connected to an input terminal of the DC/AC circuit 300b. In this embodiment, an internal topology implementation form of the DC/AC circuit 300b is not limited, and the DC/AC circuit 300b may be a two-level inverter circuit or a multi-level inverter circuit.

Because the inverter 300 internally includes a plurality of DC/DC circuits, during electric arc confirmation, the photovoltaic strings may be confirmed one by one. When the electric arc fault really occurs, the photovoltaic string with the electric arc fault may be locked. For example, the controller 500 first controls output voltages or output currents of all the converters (1-1 to 1-n) in the first photovoltaic string 100 to perform electric arc confirmation, and then controls output voltages or output currents of all the converters (2-1 to 2-m) in the second photovoltaic string 200 to perform electric arc confirmation, to determine whether the electric arc fault really occurs. In addition, when the electric arc fault really occurs, it may be determined whether the electric arc fault occurs in the first photovoltaic string 100 or in the second photovoltaic string 200. The foregoing is merely an example in which the controller 500 first performs electric arc confirmation on the first photovoltaic string 100, and then performs electric arc confirmation on the second photovoltaic string 200. It should be understood that the controller 500 may first perform electric arc confirmation on the second photovoltaic string 200, and then perform electric arc confirmation on the first photovoltaic string 100.

The photovoltaic system described in FIG. 7 is described by using an example in which each DC/DC circuit corresponds to one photovoltaic string. The following describes an example in which each DC/DC circuit may correspond to the plurality of photovoltaic strings. The following uses an example in which one DC/DC circuit corresponds to two photovoltaic strings for description.

Figure 8:
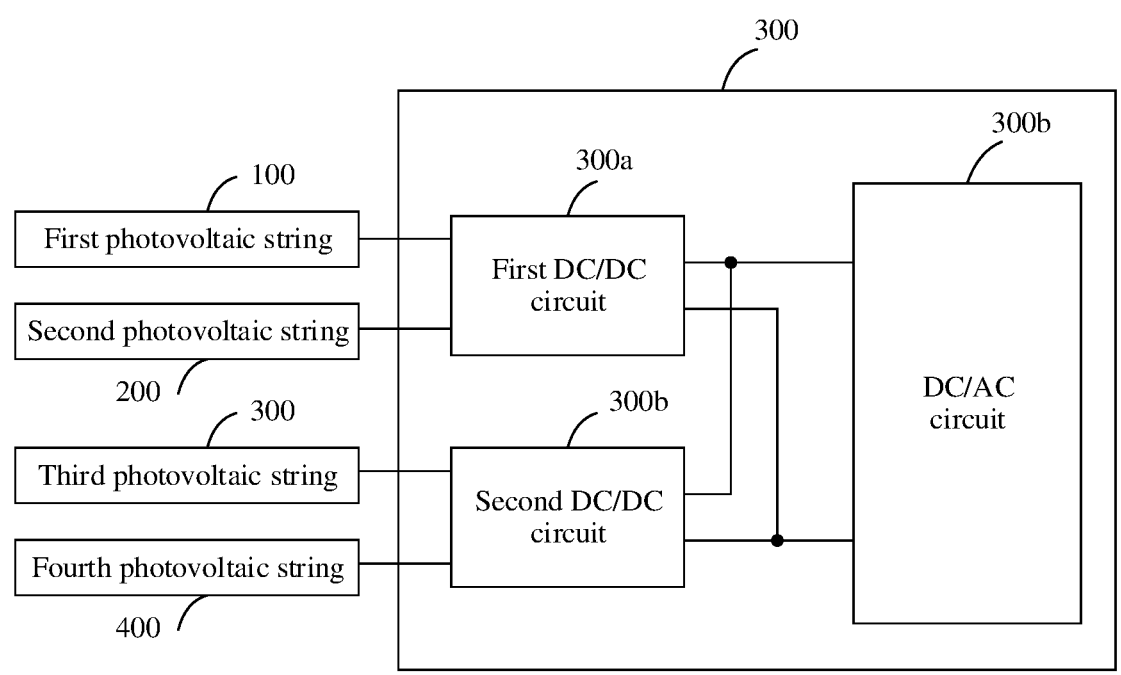
FIG. 8 is a schematic diagram of yet another photovoltaic system according to an embodiment.

FIG. 8 is a schematic diagram of yet another photovoltaic system according to an embodiment.

In this embodiment, an example in which the inverter 300 includes two DC/DC circuits is used for description, or more DC/DC circuits may be included. Each DC/DC circuit is connected to the plurality of photovoltaic strings. In this embodiment, an example in which each DC/DC circuit is connected to two photovoltaic strings is used for description, or more photovoltaic strings may be connected.

The first DC/DC circuit 300a1 is connected to the first photovoltaic string 100 and the second photovoltaic string 200. The second DC/DC circuit 300a2 is connected to the third photovoltaic string 300 and the fourth photovoltaic string 400.

Figure 9:
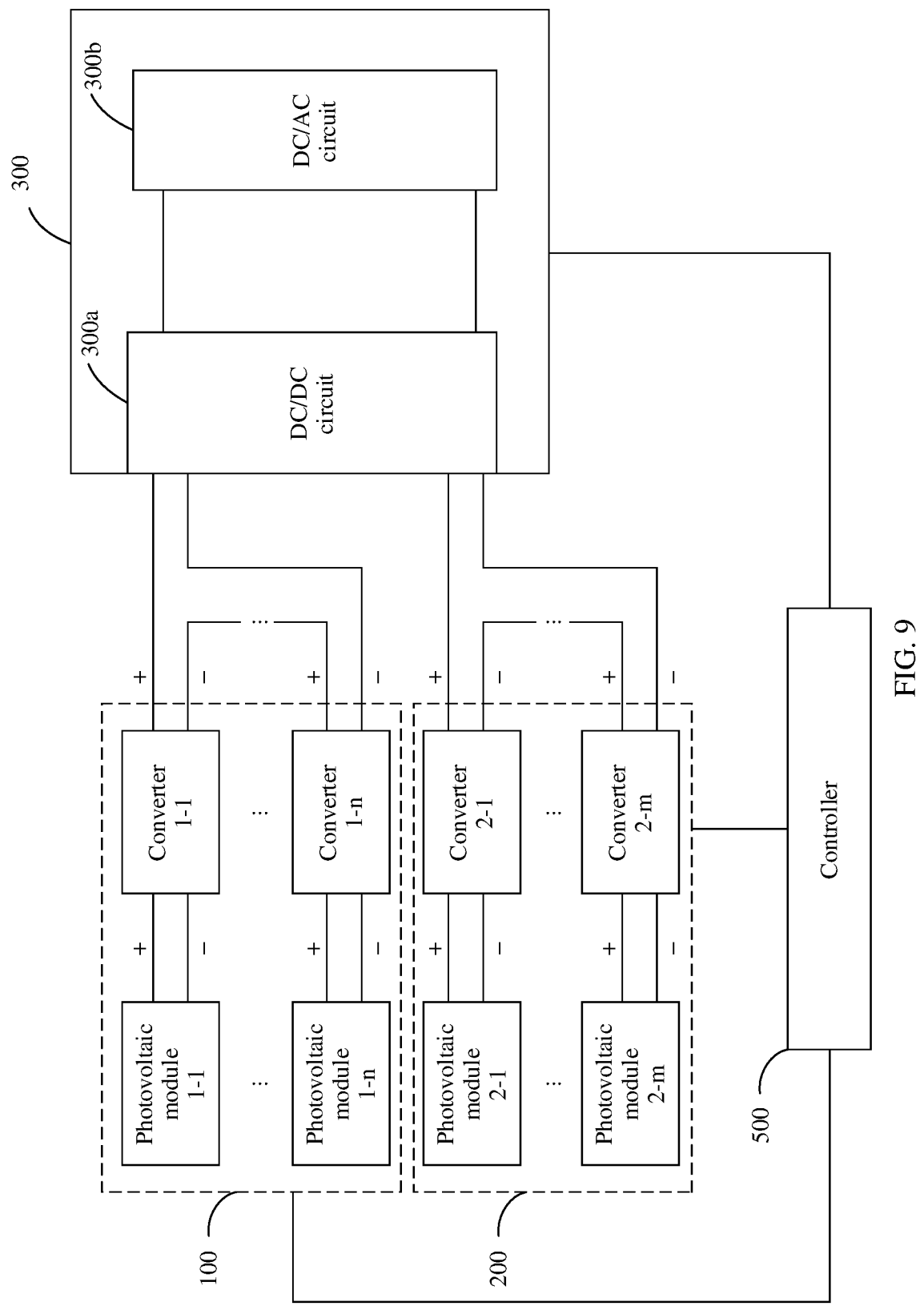
FIG. 9 is a schematic diagram of still yet another photovoltaic system according to an embodiment.

With reference to FIG. 9, the following describes the electric arc confirmation process when one DC/DC circuit corresponds to the plurality of photovoltaic strings.

FIG. 9 is a schematic diagram of still yet another photovoltaic system according to an embodiment.

For ease of description, in this embodiment, an example in which the inverter 300 includes one DC/DC circuit is used for description. The DC/DC circuit is connected to the plurality of photovoltaic strings. In an actual product, the inverter 300 may include a plurality of DC/DC circuits, and each DC/DC circuit is separately connected to respective corresponding photovoltaic strings. Details are not described herein.

As shown in FIG. 9, the input terminal of the DC/DC circuit 300a is connected to the first photovoltaic string 100 and the second photovoltaic string 200. The controller 500 may first control output voltages or output currents of all the converters (1-1 to 1-n) in the first photovoltaic string 100 to perform electric arc confirmation, and then control output voltages or output currents of all the converters (2-1 to 2-m) in the second photovoltaic string 200 to perform electric arc confirmation, to determine whether the electric arc fault really occurs. In addition, when the electric arc fault really occurs, it may be determined whether the electric arc fault occurs in the first photovoltaic string 100 or in the second photovoltaic string 200. The foregoing is merely an example in which the controller 500 first performs electric arc confirmation on the first photovoltaic string 100, and then performs electric arc confirmation on the second photovoltaic string 200. It should be understood that the controller 500 may first perform electric arc confirmation on the second photovoltaic string 200, and then perform electric arc confirmation on the first photovoltaic string 100.

The foregoing is described by using an example in which the inverter includes the DC/DC circuit. The following describes an implementation in which the inverter does not include the DC/DC circuit but includes only the DC/AC circuit.

Figure 10:
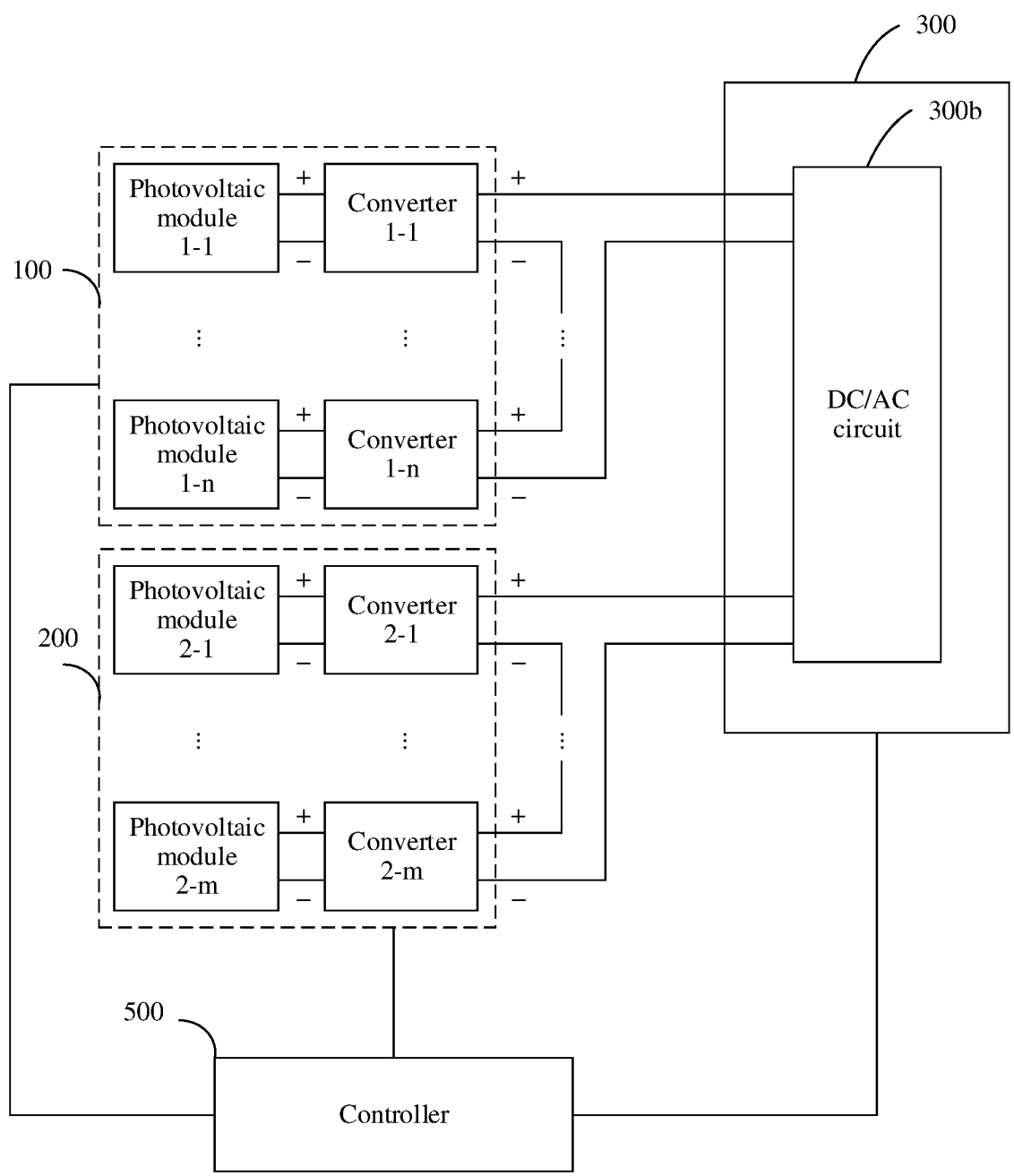
FIG. 10 is a schematic diagram of still yet another photovoltaic system according to an embodiment.

FIG. 10 is a schematic diagram of still yet another photovoltaic system according to an embodiment.

According to the photovoltaic system provided in this embodiment, the inverter 300 does not include the DC/DC circuit but includes the DC/AC circuit 300b. The output terminals of the plurality of photovoltaic strings are directly connected to the DC/AC circuit 300b. In this embodiment, two photovoltaic strings are used as an example for description. The output terminals of the first photovoltaic string 100 and the second photovoltaic string 200 are both connected to the DC/AC circuit 300b.

The controller 500 may first control output voltages or output currents of all the converters (1-1 to 1-n) in the first photovoltaic string 100 to perform electric arc confirmation, and then control output voltages or output currents of all the converters (2-1 to 2-m) in the second photovoltaic string 200 to perform electric arc confirmation, to determine whether the electric arc fault really occurs. In addition, when the electric arc fault really occurs, it may be determined whether the electric arc fault occurs in the first photovoltaic string 100 or in the second photovoltaic string 200. The foregoing is merely an example in which the controller 500 first performs electric arc confirmation on the first photovoltaic string 100, and then performs electric arc confirmation on the second photovoltaic string 200. It should be understood that the controller 500 may first perform electric arc confirmation on the second photovoltaic string 200, and then perform electric arc confirmation on the first photovoltaic string 100.

To make the photovoltaic system recover when it is determined that the detected electric arc is a false electric arc, for example, to perform maximum power tracking, electric arc confirmation control is not performed. After the controller is configured to increase the input current of the inverter to the input current of the inverter when the electric arc is detected to run for a first preset time period, if no electric arc is detected, the current when the electric arc is detected may be recovered to run for the first preset time period. In this case, it indicates that the photovoltaic system can recover, and it indicates that the previously detected electric arc is the false electric arc rather than the true electric arc. The output voltage of the at least one photovoltaic string is not controlled to decrease to the first preset voltage. Alternatively, after the controller is configured to decrease the input voltage of the inverter to the input voltage of the inverter when the electric arc is detected to run for a second preset time period, if no electric arc is detected, the input voltage when the electric arc is detected may be recovered to run for a time period. In this case, it indicates that the previously detected electric arc is not the true electric arc. The maximum value of the output current of the at least one photovoltaic string is not controlled to be the first preset current. The first preset time period and the second preset time period may be the same or may be different. This is not limited.

Inverter Embodiment

According to the photovoltaic system provided in the foregoing embodiments, this embodiment may further provide an inverter. The following describes the inverter in detail with reference to the accompanying drawings.

Figure 11:
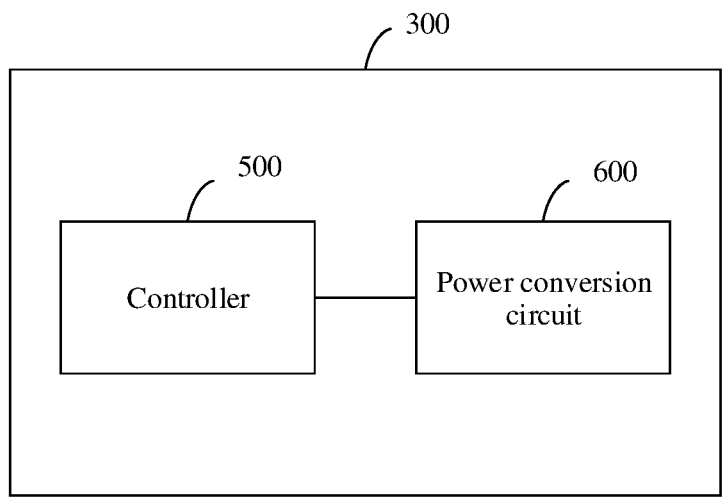
FIG. 11 is a schematic diagram of an inverter according to an embodiment.

FIG. 11 is a schematic diagram of an inverter according to an embodiment.

The inverter provided in this embodiment may include an inverter controller 500 and a power conversion circuit 600.

An input terminal of the power conversion circuit 600 is connected to at least one photovoltaic string. Each of the at least one photovoltaic string includes at least one converter. An input terminal of each of the at least one converter is connected to a corresponding photovoltaic module. When the photovoltaic string includes at least two converters, output terminals of the at least two converters are connected in series and connected to the input terminal of the power conversion circuit.

The inverter controller 500 is configured to: when an electric arc is detected, control an input current of the inverter to decrease to extinguish the arc; and after the arc is extinguished, control an output voltage of the at least one photovoltaic string to decrease to a first preset voltage, where the first preset voltage is less than an input voltage of the inverter when the electric arc is detected; or control a maximum value of an output current of the at least one photovoltaic string to be a first preset current. The first preset current is less than the input current of the inverter when the electric arc is detected.

A structure of the power conversion circuit 600 in the inverter is not limited in this embodiment. However, the power conversion circuit 600 includes at least one DC/AC circuit and may further include a DC/DC circuit. For example, for an architecture of the inverter, refer to topology forms shown in FIG. 7 to FIG. 10. The power conversion circuit 600 may include one DC/DC circuit or may include at least two DC/DC circuits. An input terminal of each of the at least two DC/DC circuits is connected to at least one photovoltaic string, that is, each DC/DC circuit may be connected to one photovoltaic string or may be connected to a plurality of photovoltaic strings. This is not limited in this embodiment.

When the voltage is pulled down, after controlling the output voltage of the at least one photovoltaic string to decrease to the first preset voltage, the inverter controller is further configured to increase the input current of the inverter from the input current of the inverter during arc extinguishing to a current greater than the corresponding input current of the inverter during arc extinguishing, that is, a second preset current.

For example, after controlling the output voltage of the at least one photovoltaic string to decrease to the first preset voltage, the inverter controller is further configured to: control the input current of the inverter to be the corresponding input current of the inverter when the electric arc is detected, and when detecting that the input current of the inverter is the corresponding input current of the inverter when the electric arc is detected, determine that no electric arc occurs, otherwise, determine that the electric arc occurs.

When the current is pulled down, after controlling the output current of the at least one photovoltaic string to decrease to the first preset current, the inverter controller is further configured to decrease the input voltage of the inverter from the input voltage of the inverter during arc extinguishing to a voltage less than the corresponding input voltage of the inverter during arc extinguishing, that is, a second preset voltage.

For ease of description, the second preset current may be the input current of the inverter when an electric arc characteristic is detected. The second preset voltage may be the input voltage of the inverter when the electric arc is detected. When detecting the electric arc, the controller may first record a current operating point of the photovoltaic string, that is, record a current output voltage and output current of the photovoltaic string. It should be understood that the output voltage and the output current herein are an output voltage and an output current that are obtained after the converter is connected in series. For ease of understanding, the following embodiment is described by using an example in which the second preset current is the input current of the inverter when the electric arc is detected, and the second preset voltage is the input voltage of the inverter when the electric arc is detected. It should be understood that the second preset current may alternatively be another current value and may be less than the input current of the inverter when the electric arc characteristic is detected, provided that the second preset current is greater than the current during arc extinguishing. Similarly, the second preset voltage may alternatively be another voltage value and may be less than the input voltage of the inverter when the electric arc is detected.

According to the inverter provided in this embodiment, electric arc confirmation may be performed in two manners when the electric arc is detected. A first manner is to control the output voltage of the photovoltaic string to be the first preset voltage and increase the input current of the inverter to the second preset current. A second manner is to control the maximum value of the output current of the photovoltaic string to be the first preset current and decrease the input voltage of the inverter to the second preset voltage. If the photovoltaic system can successfully recover, it indicates that no true electric arc exists. If the photovoltaic system cannot recover, it indicates that the true electric arc exists. Regardless of the first manner or the second manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

According to the inverter provided in this embodiment, when electric arc confirmation is performed, the inverter controller sends a control instruction to each converter in the photovoltaic string, so that the converter changes an output voltage or output current thereof. The controller may be configured to control the output voltage of each converter in the at least one photovoltaic string to decrease, so that the output voltage of the at least one photovoltaic string decreases to the first preset voltage. The first preset voltage is less than the input voltage when the electric arc is detected.

It should be understood that the inverter controller may control the converters to output a same voltage or may control the converters to output different voltages. The following describes a possible implementation. The inverter controller controls all the converters to output the same voltage. That is, the inverter controller controls, based on the first preset voltage V and a quantity n of converters included in the at least one photovoltaic string, all output voltages of the n converters to decrease to V/n, where n is a positive integer greater than or equal to 2. For example, one photovoltaic string includes 10 photovoltaic modules and 10 converters. The output voltage of the photovoltaic string is controlled to decrease to 50 V, that is, the output voltage of each converter is controlled to be 50 V/10=5 V.

The foregoing is a first electric arc confirmation mechanism for controlling the output voltage. The following describes another electric arc confirmation mechanism, which is implemented by controlling the output current of the photovoltaic string. The inverter controller may control a maximum output current of each converter in the at least one photovoltaic string to be the first preset current, so that the input current of the inverter decreases to the first preset current. The first preset current is less than the input current when the electric arc characteristic is detected. Because the converters in the photovoltaic string are connected in series, output currents of the converters are controlled to be the same.

To make the photovoltaic system recover when it is determined that the detected electric arc is a false electric arc, for example, to perform maximum power tracking, electric arc confirmation control is not performed. After the controller is configured to increase the input current of the inverter to the input current of the inverter when the electric arc is detected to run for a first preset time period, the current when the electric arc is detected may be recovered to run for the first preset time period. In this case, it indicates that the photovoltaic system can recover, and it indicates that the previously detected electric arc is the false electric arc rather than the true electric arc. The output voltage of the at least one photovoltaic string is not controlled to decrease to the first preset voltage. Alternatively, after the controller is configured to decrease the input voltage of the inverter to the input voltage of the inverter when the electric arc is detected to run for a second preset time period, the input voltage when the electric arc is detected may be recovered to run for a time period. In this case, it indicates that the previously detected electric arc is not the true electric arc. The maximum value of the output current of the at least one photovoltaic string is not controlled to be the first preset current. The first preset time period and the second preset time period may be the same or may be different. This is not limited.

Method Embodiment

According to the photovoltaic system and the inverter provided in the foregoing embodiments, this embodiment may further provide a direct current electric arc detection method. The following describes the method in detail with reference to the accompanying drawings.

Figure 12:
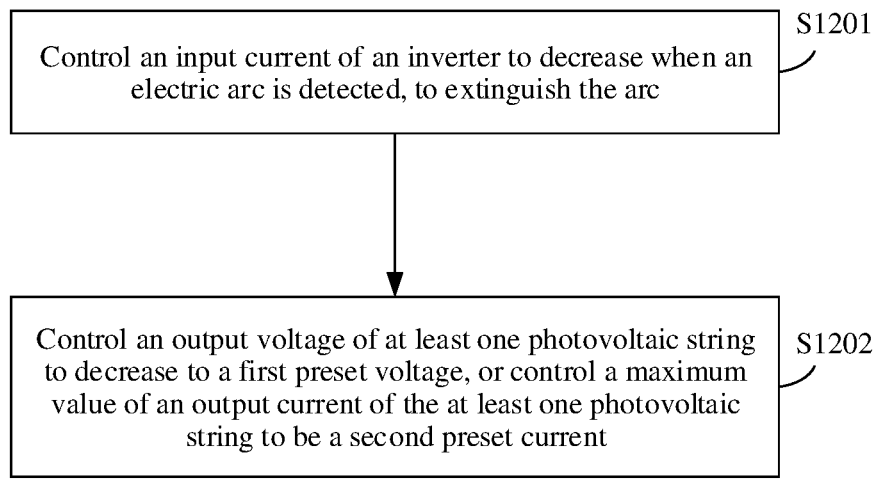
FIG. 12 is a flowchart of a direct current electric arc detection method according to an embodiment.

FIG. 12 is a flowchart of a direct current electric arc detection method according to an embodiment.

The direct current electric arc detection method provided in this embodiment is applied to the photovoltaic system. The photovoltaic system includes the inverter and at least two converters.

An input terminal of the inverter is connected to at least one photovoltaic string. Each of the at least one photovoltaic string includes at least two converters. An input terminal of each of the at least two converters is connected to a corresponding photovoltaic module. Output terminals of the at least two converters are connected in series and connected to the input terminal of the inverter.

The method includes:

S1201: Control an input current of the inverter to decrease when an electric arc is detected, to extinguish the arc.

For example, the input current of the inverter decreases to 0 to extinguish the arc. In this embodiment, the input current of the inverter is not limited to decrease to 0 and may be a low current for extinguishing the arc. Due to a characteristic of an IV curve of the photovoltaic string, a voltage is naturally pulled up when the current decreases.

S1202: Control an output voltage of the at least one photovoltaic string to decrease to a first preset voltage, where first preset voltage is less than an input voltage of the inverter when the electric arc is detected; or control a maximum value of an output current of the at least one photovoltaic string to be a first preset current. The first preset current is less than the input current of the inverter when an electric arc characteristic is detected.

According to the method provided in this embodiment, electric arc confirmation may be performed in two manners when the electric arc is detected. A first manner is to control the output voltage of the photovoltaic string to be the first preset voltage. A second manner is to control the maximum value of the output current of the photovoltaic string to be the first preset current. If the photovoltaic system can successfully recover, it indicates that no true electric arc exists. If the photovoltaic system cannot recover, it indicates that the true electric arc exists. Regardless of the first manner or the second manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

In a possible implementation, controlling the output voltage of the at least one photovoltaic string to decrease to the first preset voltage includes:

controlling an output voltage of each converter in the at least one photovoltaic string to decrease, so that the output voltage of the at least one photovoltaic string decreases to the first preset voltage.

Controlling the maximum value of the output current of the at least one photovoltaic string to be the first preset current includes:

controlling an output current of each converter in the at least one photovoltaic string to be less than or equal to the first preset current.

According to the photovoltaic system provided in this embodiment, electric arc confirmation may be performed in two manners when the electric arc characteristic is detected. A first manner is to control the output voltage of the photovoltaic string to be the first preset voltage and then increase the input current of the inverter to a second preset current. A second manner is to control the maximum value of the output current of the photovoltaic string to be the first preset current and then decrease the input voltage of the inverter to a second preset voltage. If the photovoltaic system can successfully recover, it indicates that no true electric arc exists. If the photovoltaic system cannot recover, it indicates that the true electric arc exists. Regardless of the first manner or the second manner, the electric arc does not recur in the recovery process. Because both the first preset current and the first preset voltage are specified safety values that do not cause the electric arc. In this way, the inverter avoids secondary arcing in an electric arc confirmation process, thereby avoiding damage to the photovoltaic system.

It should be understood that the second preset current may alternatively be another current value and may be less than the input current of the inverter when the electric arc is detected, provided that the second preset current is greater than the current during arc extinguishing. Similarly, the second preset voltage may alternatively be another voltage value and may be less than the input voltage of the inverter when the electric arc is detected.

To make the photovoltaic system recover when it is determined that the detected electric arc is a false electric arc, for example, to perform maximum power tracking, electric arc confirmation control is not performed. After the controller is configured to increase the input current of the inverter to the input current of the inverter when the electric arc is detected to run for a first preset time period, the current when the electric arc is detected may be recovered to run for the first preset time period. In this case, it indicates that the photovoltaic system can recover, and it indicates that the previously detected electric arc is the false electric arc rather than the true electric arc. The output voltage of the at least one photovoltaic string is not controlled to decrease to the first preset voltage. Alternatively, after the controller is configured to decrease the input voltage of the inverter to the input voltage of the inverter when the electric arc is detected to run for a second preset time period, the input voltage when the electric arc is detected may be recovered to run for a time period. In this case, it indicates that the previously detected electric arc is not the true electric arc. The maximum value of the output current of the at least one photovoltaic string is not controlled to be the first preset current. The first preset time period and the second preset time period may be the same or may be different. This is not limited.

It should be understood that, "at least one (item)" means one or more and "a plurality of" means two or more. Therefore, any simple amendment, equivalent variation, and modification made on the above embodiments without departing from the content of the solutions shall fall within the scope of the embodiments.

What is claimed is:

1. A photovoltaic system; comprising
   an inverter, wherein an input terminal of the inverter is configured to connect to at least one photovoltaic string, each photovoltaic string of the at least one photovoltaic string comprises at least one converter and a photovoltaic module corresponding to each respective converter, and an input terminal of each respective converter is connected to the corresponding photovoltaic module; and
   a controller, wherein the controller is configured to:
   when the electric arc is detected in the photovoltaic system, control an input current of the inverter to decrease to extinguish the electric arc;
   after the electric arc is extinguished, control an output voltage of the at least one photovoltaic string to decrease to a first preset voltage, wherein the first preset voltage is less than an input voltage of the inverter when the electric arc is detected; and
   after controlling the output voltage of the at least one photovoltaic string to decrease to the first preset voltage, increase the input current of the inverter to the input current of the inverter when the electric arc is detected; or
   after the electric arc is extinguished, control a maximum value of an output current of the at least one photovoltaic string to be a first preset current, wherein the first preset current is less than the input current of the inverter when the electric arc is detected; and
   after controlling the maximum value of the output current of the at least one photovoltaic string to be the first preset current, decrease the input voltage of the inverter to the input voltage of the inverter when the electric arc is detected.

2. The photovoltaic system according to claim 1, wherein the controller is further configured to:
   when no electric arc is detected within a preset time period after increasing the input current of the inverter to the input current of the inverter when the electric arc is detected, skip controlling the output voltage of the at least one photovoltaic string to decrease to the first preset voltage.

3. The photovoltaic system according to claim 1, wherein the controller is further configured to:
   when no electric arc is detected within a preset time period after decreasing the input voltage of the inverter to the input voltage of the inverter when the electric arc is detected, skip controlling the maximum value of the output current of the at least one photovoltaic string to be the first preset current.

4. The photovoltaic system according to claim 1, wherein each of the at least one photovoltaic string comprises at least two converters, an input terminal of each of the at least two converters is connected to the corresponding photovoltaic module, and output terminals of the at least two converters are connected in series and connected to the input terminal of the inverter.

5. The photovoltaic system according to claim 4, wherein the controller is further configured to control an output voltage of each converter in the at least one photovoltaic string to decrease, so that the output voltage of the at least one photovoltaic string decreases to the first preset voltage.

6. The photovoltaic system according to claim 5, wherein the controller is further configured to control, based on the first preset voltage V and a quantity n of converters comprised in the at least one photovoltaic string, all output voltages of n converters to decrease to V/n, wherein n is a positive integer greater than or equal to 2.

7. The photovoltaic system according to claim 6, wherein the controller is an inverter controller;
   the inverter controller is further configured to send a voltage control instruction to the n converters in the at least one photovoltaic string, and the voltage control instruction carries V/n; and
   the n converters are configured to control, based on V/n carried in the voltage control instruction, the output voltages to be V/n.

8. The photovoltaic system according to claim 4, wherein the controller is further configured to send a current control instruction to each converter in the at least one photovoltaic string, to control an output current of each converter in the at least one photovoltaic string to be less than or equal to the first preset current.

9. The photovoltaic system according to claim 8, wherein the inverter controller is further configured to send the voltage control instruction or the current control instruction to the n converters through 485, PLC, WIFI, or ZigBee, to control a voltage output or current output of the converter.

10. An inverter, comprising
    an inverter controller; and
    a power conversion circuit, wherein
    an input terminal of the power conversion circuit is configured to connect to at least one photovoltaic string, each of the at least one photovoltaic string comprises at least one converter and a photovoltaic module corresponding to each converter, and an input terminal of each converter is connected to the corresponding photovoltaic module; and the inverter controller is configured to:

when the electric arc is detected between the at least one photovoltaic string and the inverter, control an input current of the inverter to decrease to extinguish the electric arc; and after the electric arc is extinguished, control an output voltage of the at least one photovoltaic string to decrease to a first preset voltage, wherein the first preset voltage is less than an input voltage of the inverter when the electric arc is detected; and after controlling the output voltage of the at least one photovoltaic string to decrease to the first preset voltage, increase the input current of the inverter to the input current of the inverter when the electric arc is detected; or after the electric arc is extinguished, control a maximum value of an output current of the at least one photovoltaic string to be a first preset current, wherein the first preset current is less than the input current of the inverter when the electric arc is detected; and after controlling the maximum value of the output current of the at least one photovoltaic string to be the first preset current, decrease the input voltage of the inverter to the input voltage of the inverter when the electric arc is detected.

11. The inverter according to claim 10, wherein each of the at least one photovoltaic string comprises at least two converters; and the inverter controller is further configured to send a current control instruction to each converter in the at least one photovoltaic string, to control a maximum output current of each converter in the at least one photovoltaic string to be the first preset current.

12. The inverter according to claim 10, wherein the inverter controller is further configured to:

after no electric arc is detected within a preset time period after increasing the input current of the inverter to the input current of the inverter when the electric arc is detected, skip controlling the output voltage of the at least one photovoltaic string to decrease to the first preset voltage.

13. A direct current electric arc detection method, applied to a photovoltaic system, wherein the photovoltaic system comprises an inverter and at least one converter;

an input terminal of the inverter is configured to connect to at least one photovoltaic string, each of the at least one photovoltaic string comprises at least one converter and a photovoltaic module corresponding to each converter, and an input terminal of each converter is connected to the corresponding photovoltaic module; and the method comprises:

when the electric arc is detected in the photovoltaic system, controlling an input current of the inverter to decrease to extinguish the electric arc;

after the electric arc is extinguished, controlling an output voltage of the at least one photovoltaic string to decrease to a first preset voltage, wherein the first preset voltage is less than an input voltage of the inverter when the electric arc is detected; and after controlling the output voltage of the at least one photovoltaic string to decrease to the first preset voltage, increasing the input current of the inverter to the input current of the inverter when the electric arc is detected; or after the electric arc is extinguished, controlling a maximum value of an output current of the at least one photovoltaic string to be a first preset current, wherein the first preset current is less than the input current of the inverter when the electric arc is detected; and after controlling the maximum value of the output current of the at least one photovoltaic string to be the first preset current, decreasing the input voltage of the inverter to the input voltage of the inverter when the electric arc is detected.

14. The method according to claim 13, wherein each of the at least one photovoltaic string comprises at least two converters; and controlling the output voltage of the at least one photovoltaic string to decrease to the first preset voltage further comprises:

controlling an output voltage of each converter in the at least one photovoltaic string to decrease, so that the output voltage of the at least one photovoltaic string decreases to the first preset voltage, or each of the at least one photovoltaic string comprises at least two converters; and controlling the maximum value of the output current of the at least one photovoltaic string to be the first preset current further comprises:

controlling an output current of each converter in the at least one photovoltaic string to be less than or equal to the first preset current.

* * * * *